(12) United States Patent
Miyashita et al.

(10) Patent No.: US 12,198,441 B2
(45) Date of Patent: Jan. 14, 2025

(54) THREE-DIMENSIONAL-OBJECT DETECTION DEVICE, ON-VEHICLE SYSTEM, AND THREE-DIMENSIONAL-OBJECT DETECTION METHOD

(71) Applicant: Faurecia Clarion Electronics Co., Ltd., Saitama (JP)

(72) Inventors: Ayano Miyashita, Saitama (JP); Naoki Shimizu, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 392 days.

(21) Appl. No.: 17/798,612

(22) PCT Filed: Jan. 27, 2021

(86) PCT No.: PCT/JP2021/002908
§ 371 (c)(1),
(2) Date: Aug. 10, 2022

(87) PCT Pub. No.: WO2021/166576
PCT Pub. Date: Aug. 26, 2021

(65) Prior Publication Data
US 2023/0094672 A1    Mar. 30, 2023

(30) Foreign Application Priority Data

Feb. 17, 2020  (JP) .................................. 2020-024175
Feb. 17, 2020  (JP) .................................. 2020-024176

(51) Int. Cl.
*G06V 20/58*   (2022.01)
*B60R 1/27*    (2022.01)
(Continued)

(52) U.S. Cl.
CPC ................ *G06V 20/58* (2022.01); *B60R 1/27* (2022.01); *G06T 7/60* (2013.01); *G06T 7/74* (2017.01);
(Continued)

(58) Field of Classification Search
CPC ...... G06V 20/58; G06V 10/22; G06V 20/588; G06V 20/647; G06V 2201/08; B60R 1/27;
(Continued)

(56) References Cited

U.S. PATENT DOCUMENTS 9,349,059 B2    5/2016  Hayakawa et al.
9,990,534 B2 *  6/2018  Kakita ...................... G06T 5/00
(Continued)

FOREIGN PATENT DOCUMENTS

| JP | 2008-227646 A | 9/2008 |
| JP | 2009-71790 A  | 4/2009 |

(Continued)

OTHER PUBLICATIONS

International Search Report of PCT/JP2021/002908 mailed on Apr. 13, 2021.
(Continued)

*Primary Examiner* — Bobbak Safaipour
*Assistant Examiner* — Dylan Joseph Sherrillo
(74) *Attorney, Agent, or Firm* — IP Business Solutions, LLC

(57) ABSTRACT

A three-dimensional object detecting device generates a mask image that masks regions outside a three-dimensional object candidate region in a difference image of a first overhead image and a second overhead view image for which the imaging locations O are mutually aligned, identifies a near ground contact line of a three-dimensional object based on a masked difference image. The difference
(Continued)

(Near Region Three-Dimensional Object Identification)    (Far Region Three-Dimensional Object Identification)

image is masked with the mask image, finds an end point of the three-dimensional object based on the masked difference image, identifies the width of the three-dimensional object based on a distance between a non-masking region boundary and the end point of the three-dimensional object in the mask image, identifies a far ground contact line of the three-dimensional object based on the width of the three-dimensional object and the near ground contact line, and identifies the location of the three-dimensional object in the difference image based on the near ground contact line and the far ground contact line.

10 Claims, 35 Drawing Sheets

(51) Int. Cl.
  *G06T 7/60* (2017.01)
  *G06T 7/73* (2017.01)
  *G06V 10/22* (2022.01)
  *G06V 20/56* (2022.01)
  *G06V 20/64* (2022.01)
(52) U.S. Cl.
  CPC ............ *G06V 10/22* (2022.01); *G06V 20/588* (2022.01); *G06V 20/647* (2022.01); *B60R 2300/607* (2013.01); *G06T 2207/30256* (2013.01); *G06V 2201/08* (2022.01)
(58) Field of Classification Search
  CPC ....... B60R 2300/607; G06T 7/60; G06T 7/74; G06T 2207/30256; G06T 7/55; G06T 2207/30261; G08G 1/16; H04N 7/18
  See application file for complete search history.

(56) References Cited

U.S. PATENT DOCUMENTS

| | | | |
|---|---|---|---|
| 2009/0073263 | A1 | 3/2009 | Harada et al. |
| 2014/0152827 | A1* | 6/2014 | Yamamoto ................ B60R 1/27 348/148 |
| 2015/0125031 | A1 | 5/2015 | Hayakawa et al. |
| 2015/0324972 | A1* | 11/2015 | Hayakawa ............. G06V 20/52 348/148 |

FOREIGN PATENT DOCUMENTS

| | | | |
|---|---|---|---|
| JP | 5137717 B2 * | 2/2013 | |
| JP | 6413318 B2 * | 10/2018 | |
| WO | 2013/125335 A1 | 8/2013 | |
| WO | 2014/017521 A1 | 1/2014 | |
| WO | 2014/017522 A1 | 1/2014 | |

OTHER PUBLICATIONS

Written Opinion of the International Searching Authority of PCT/JP2021/002908 mailed on Apr. 13, 2021.
International Preliminary Report on Patentability of PCT Application No. PCT/JP2021/002908 issued on Aug. 23, 2022.

* cited by examiner

[FIG. 1]
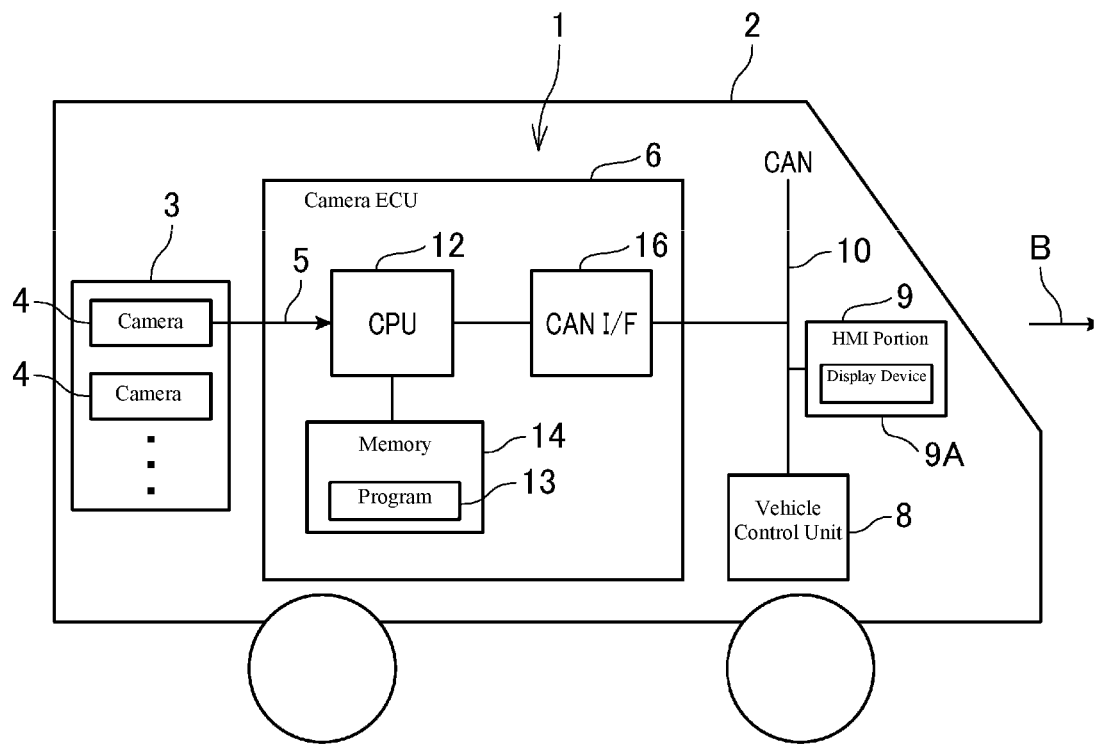

[FIG. 2]
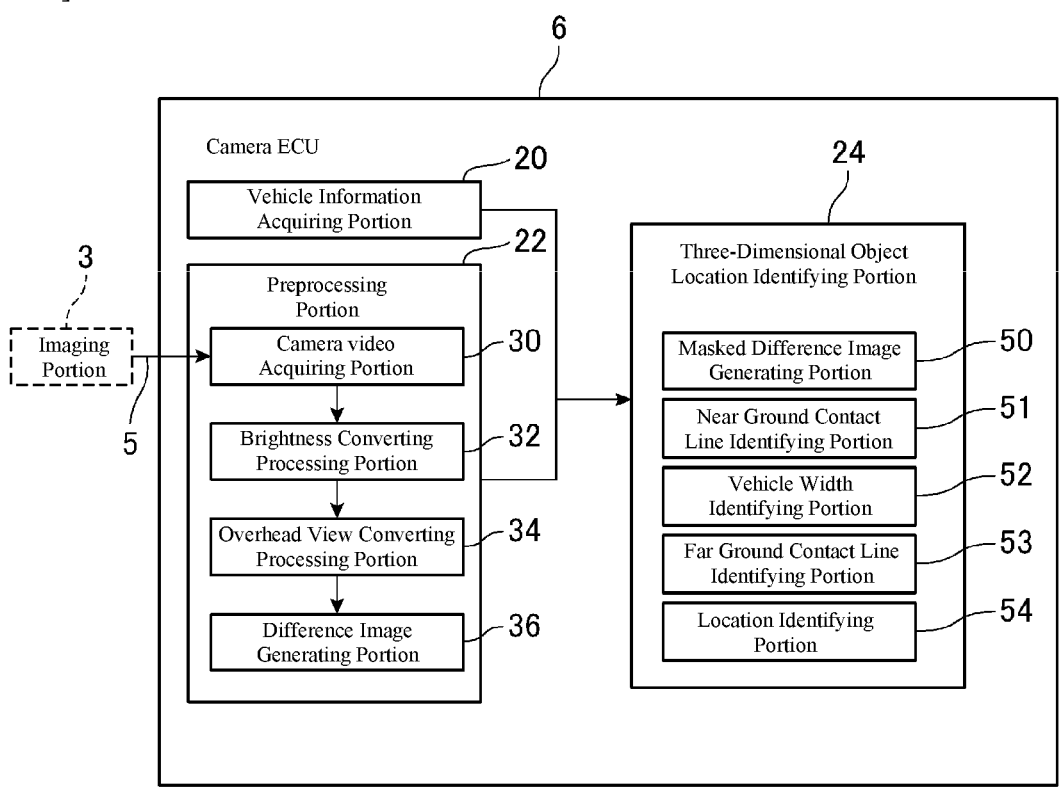

[FIG. 3]
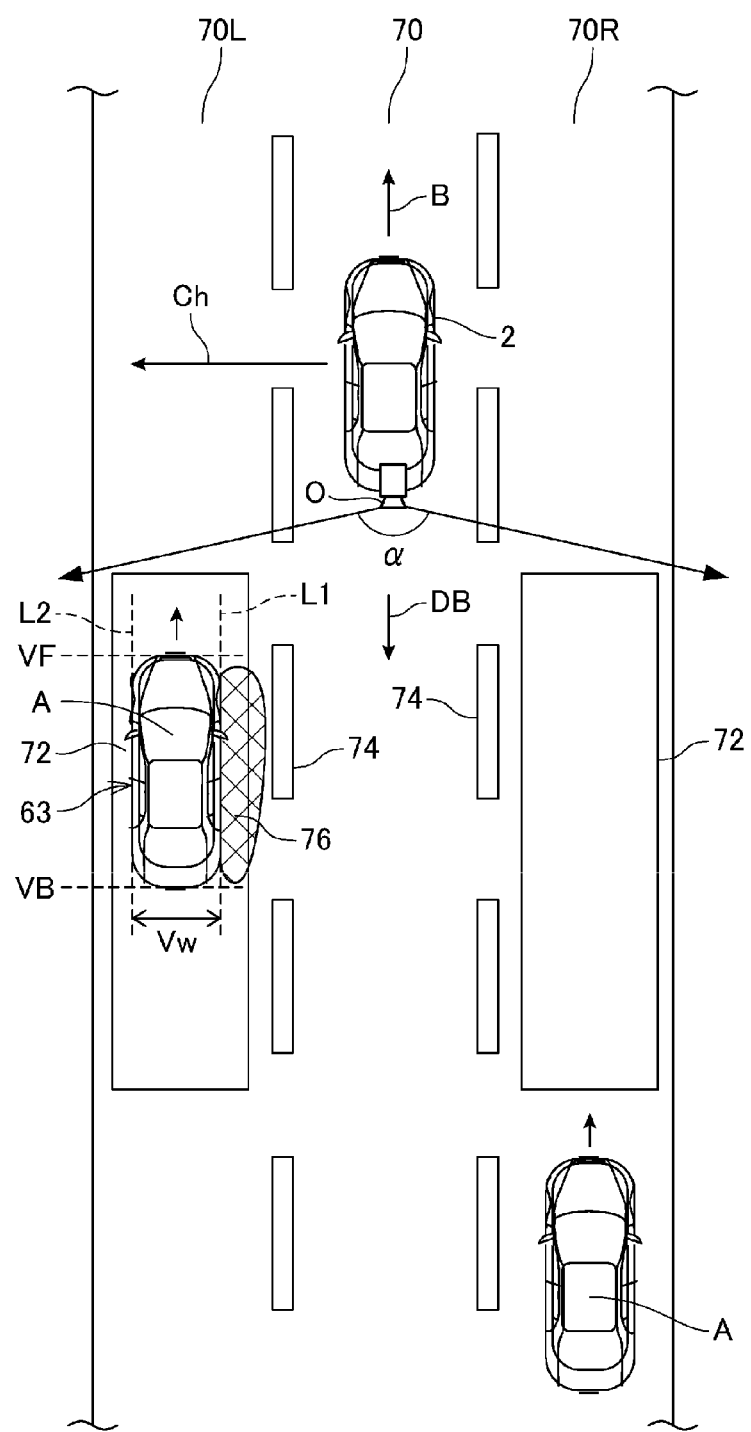

[FIG. 4]
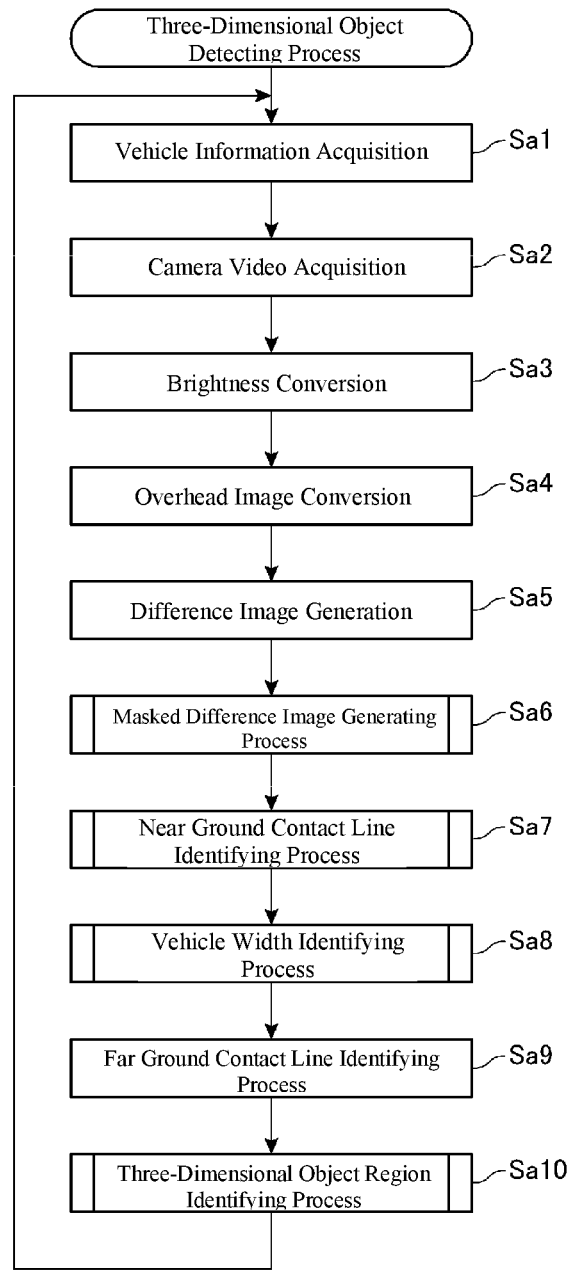

[FIG. 5 (A)]
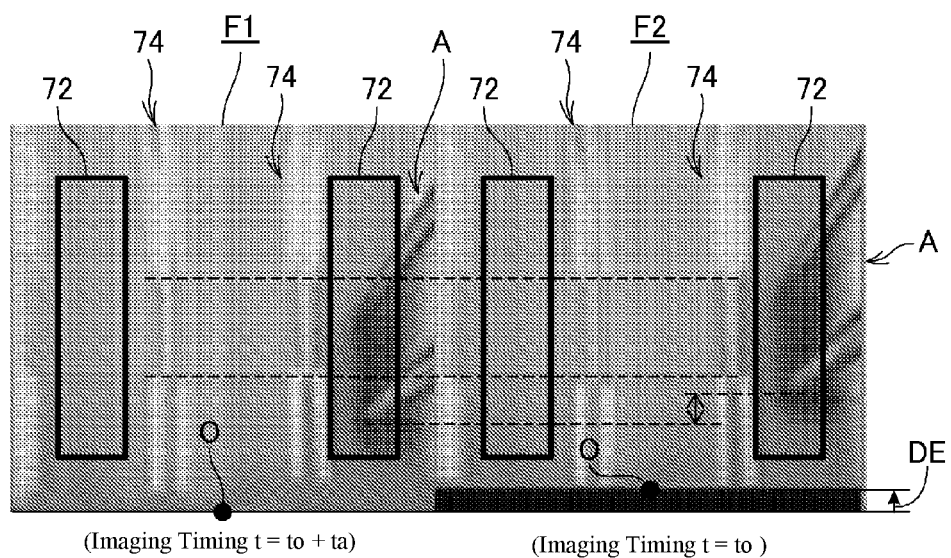
(Imaging Timing t = to + ta)    (Imaging Timing t = to )
⬇ Difference Extraction
[FIG. 5 (B)]
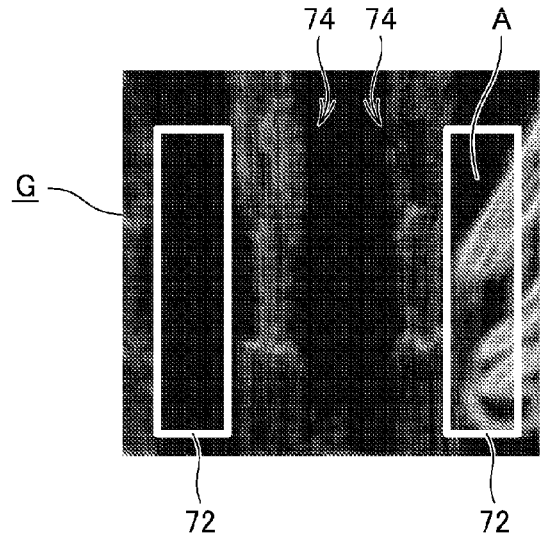

[FIG. 6]
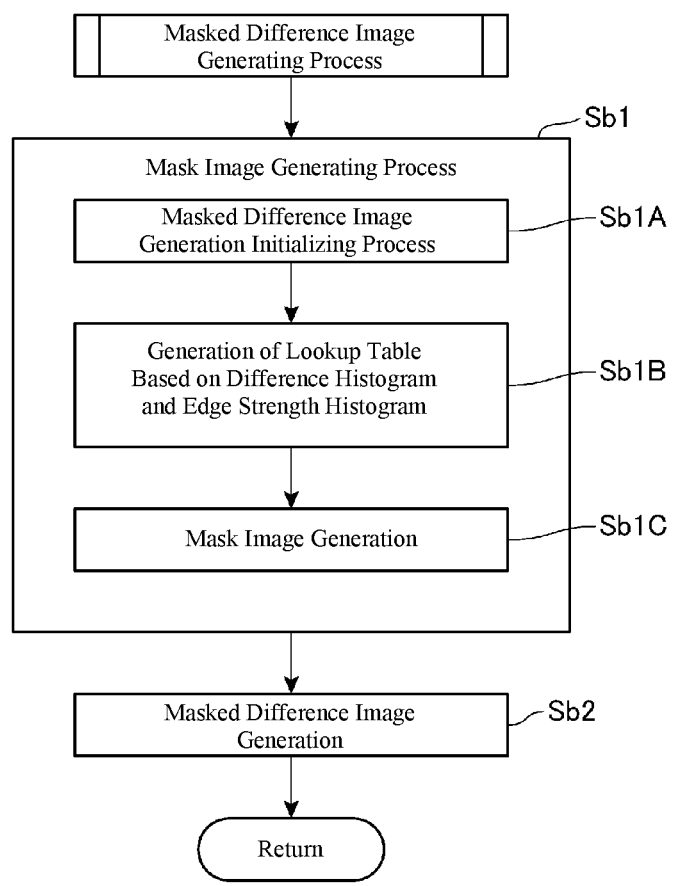

[FIG. 7 (A)]
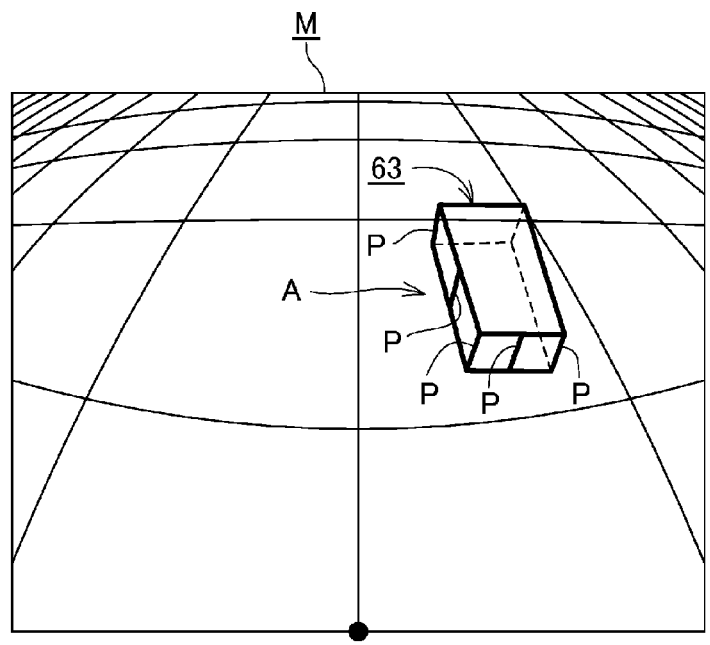
[FIG. 7 (B)]
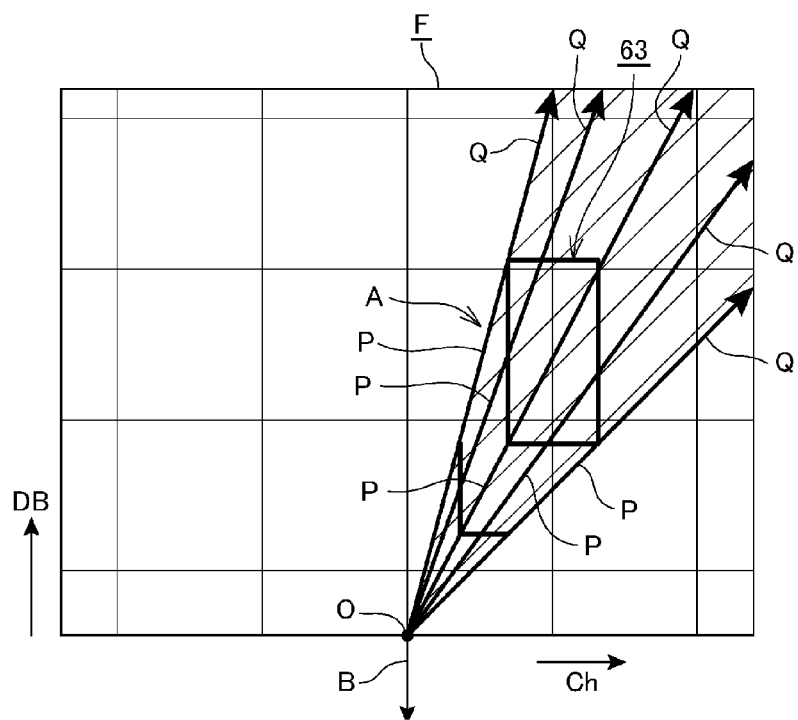

[FIG. 8]
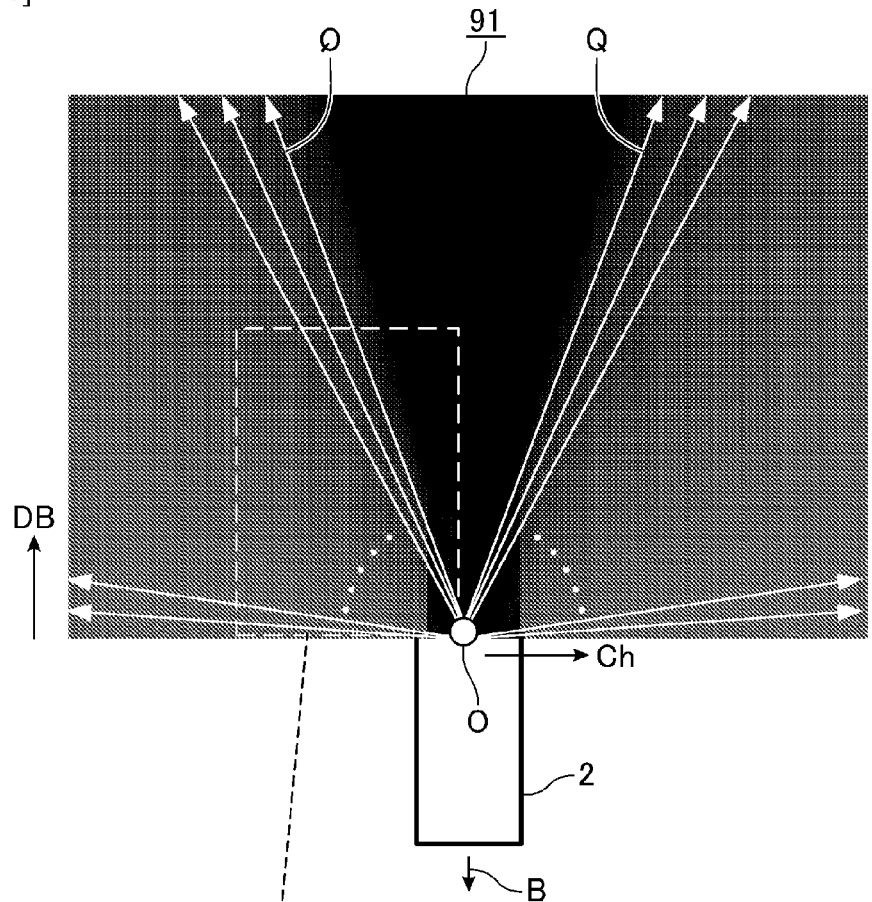

[FIG. 9]

[FIG. 10 (A)]
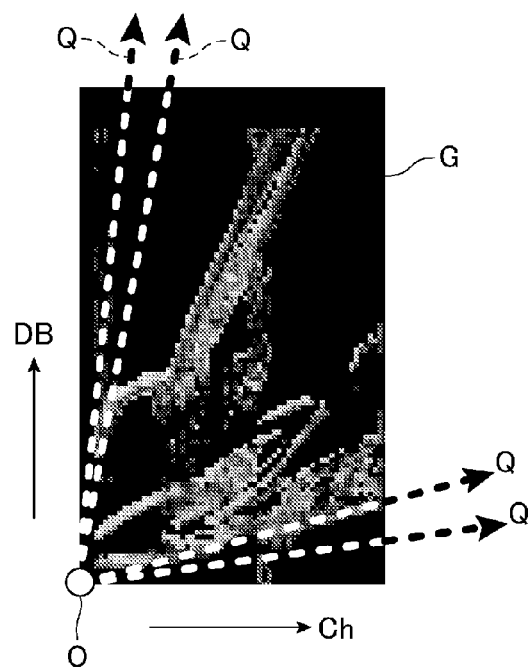
[FIG. 10 (B)]
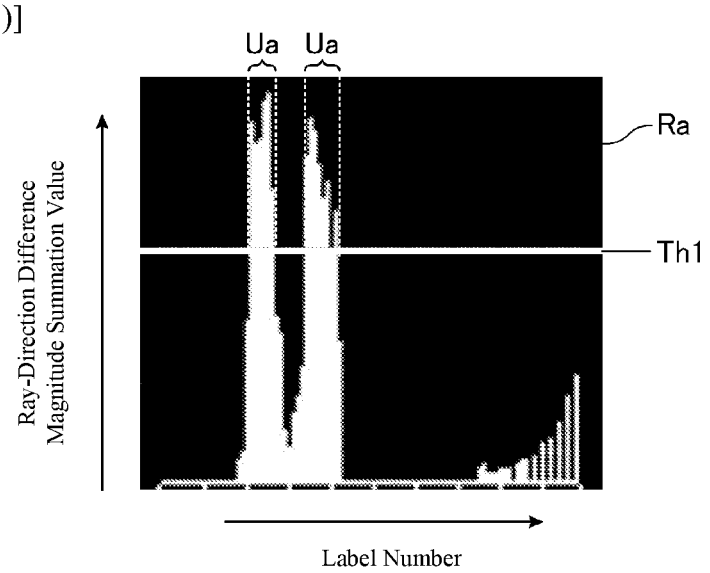

[FIG. 11 (A)]
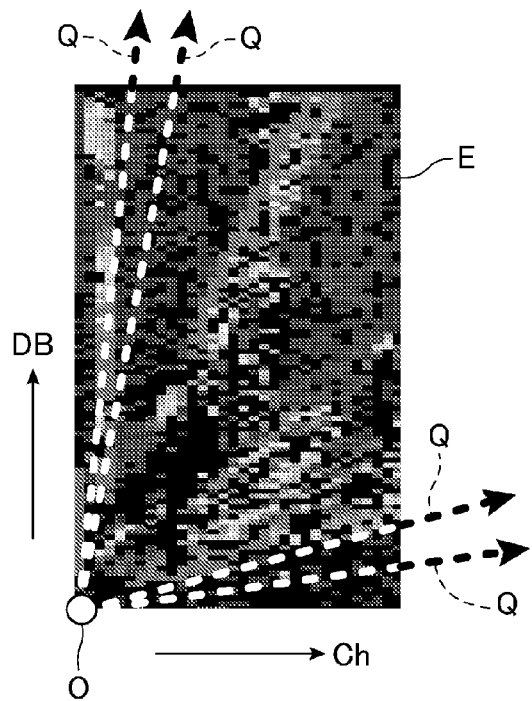
[FIG. 11 (B)]
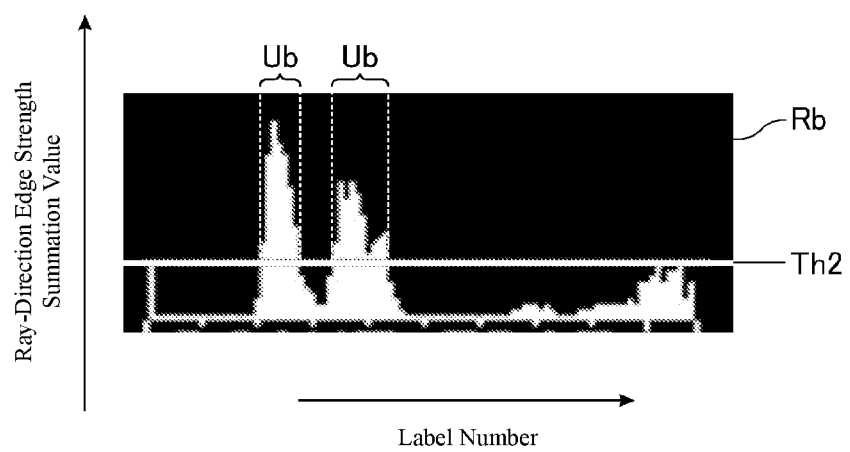

[FIG. 12 (A)]
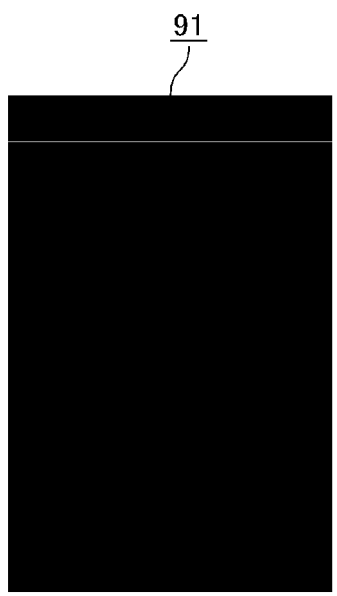
[FIG. 12 (B)]
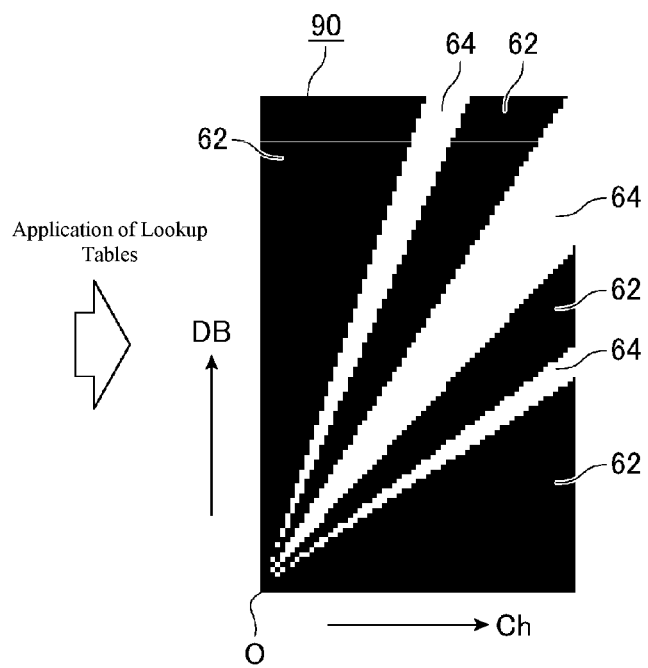
Application of Lookup Tables

[FIG. 13]
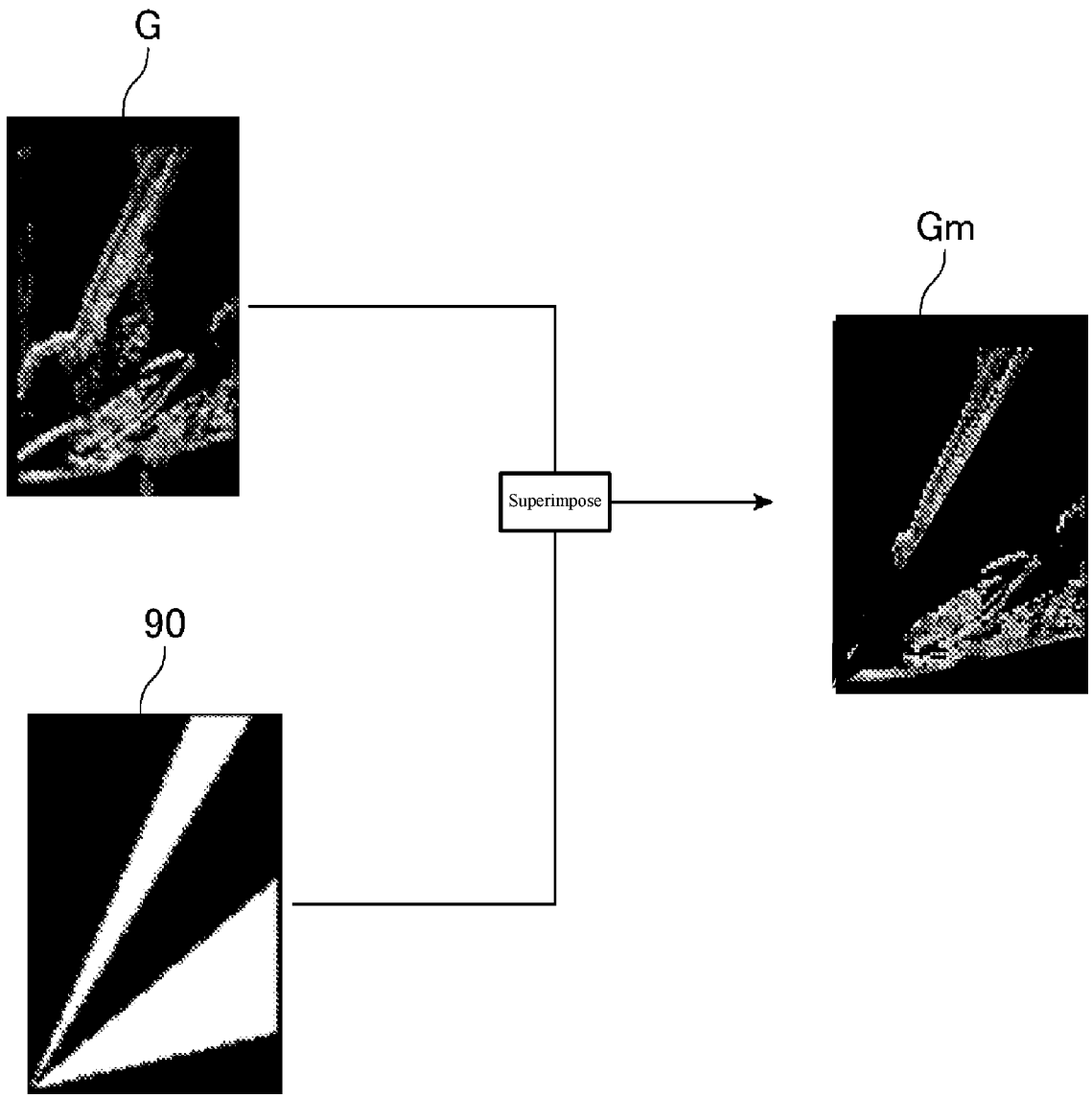

[FIG. 14]
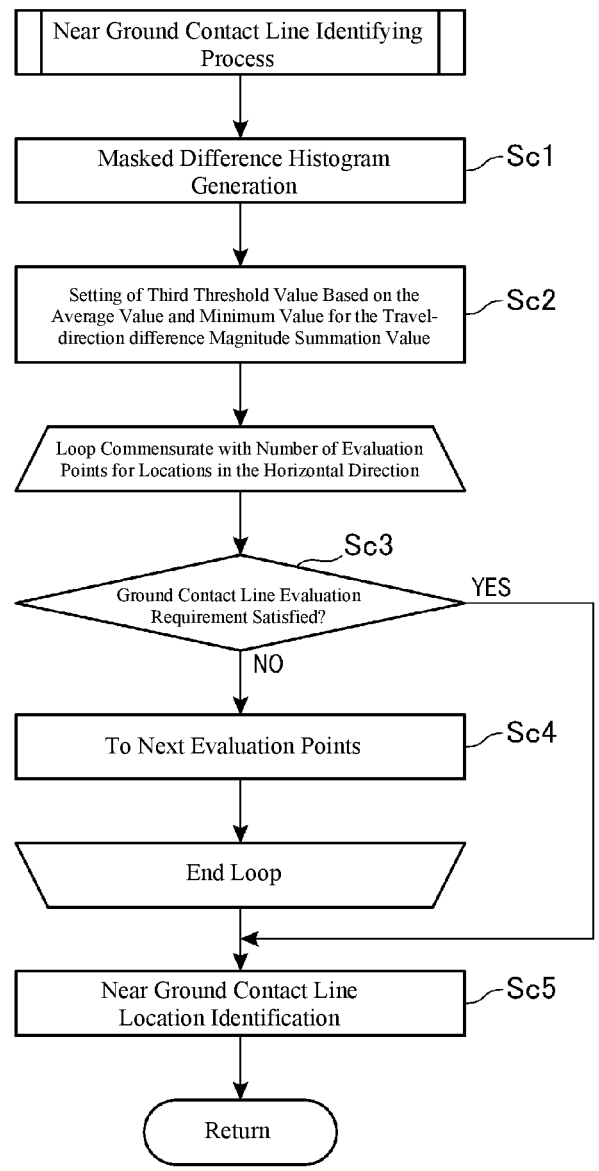

[FIG. 15 (A)]
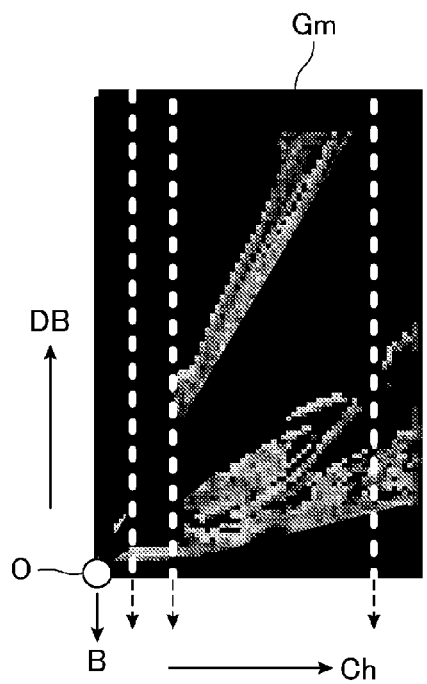
[FIG. 15 (B)]
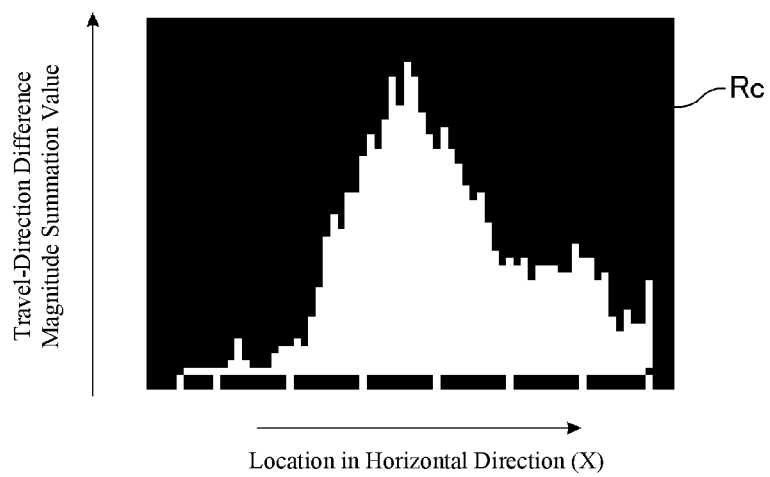

[FIG. 16]
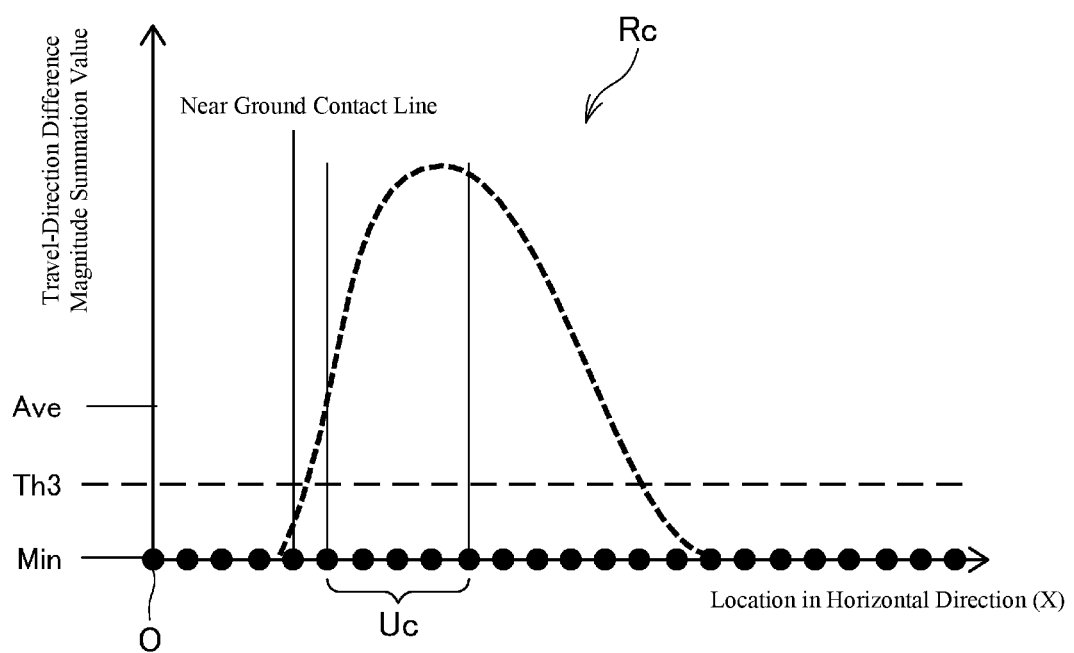

[FIG. 17]
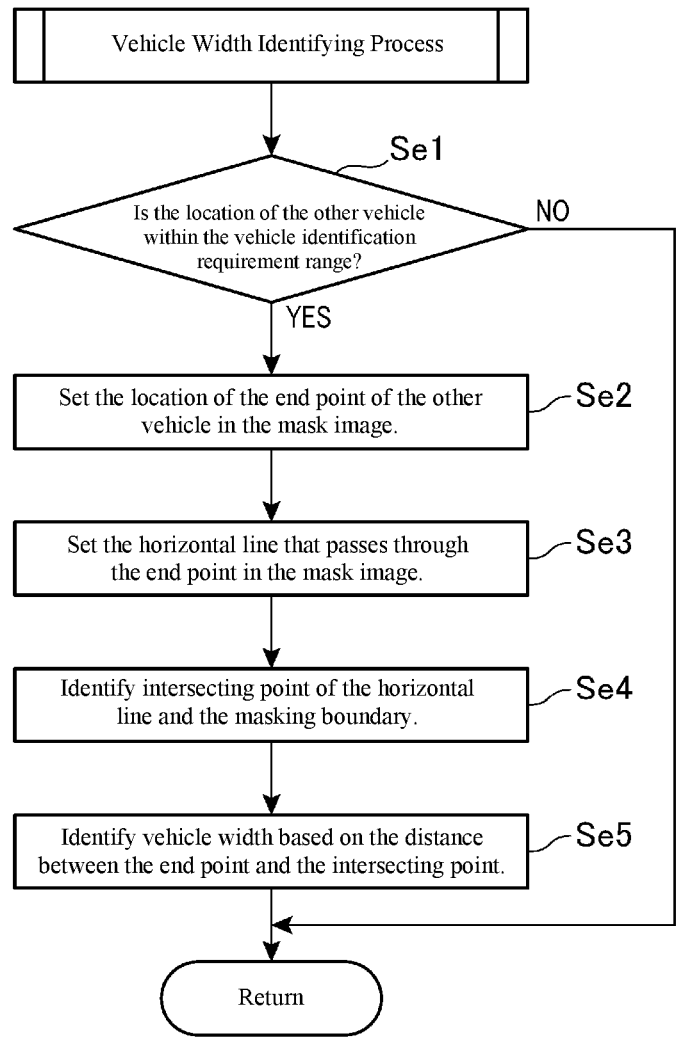

[FIG. 18]
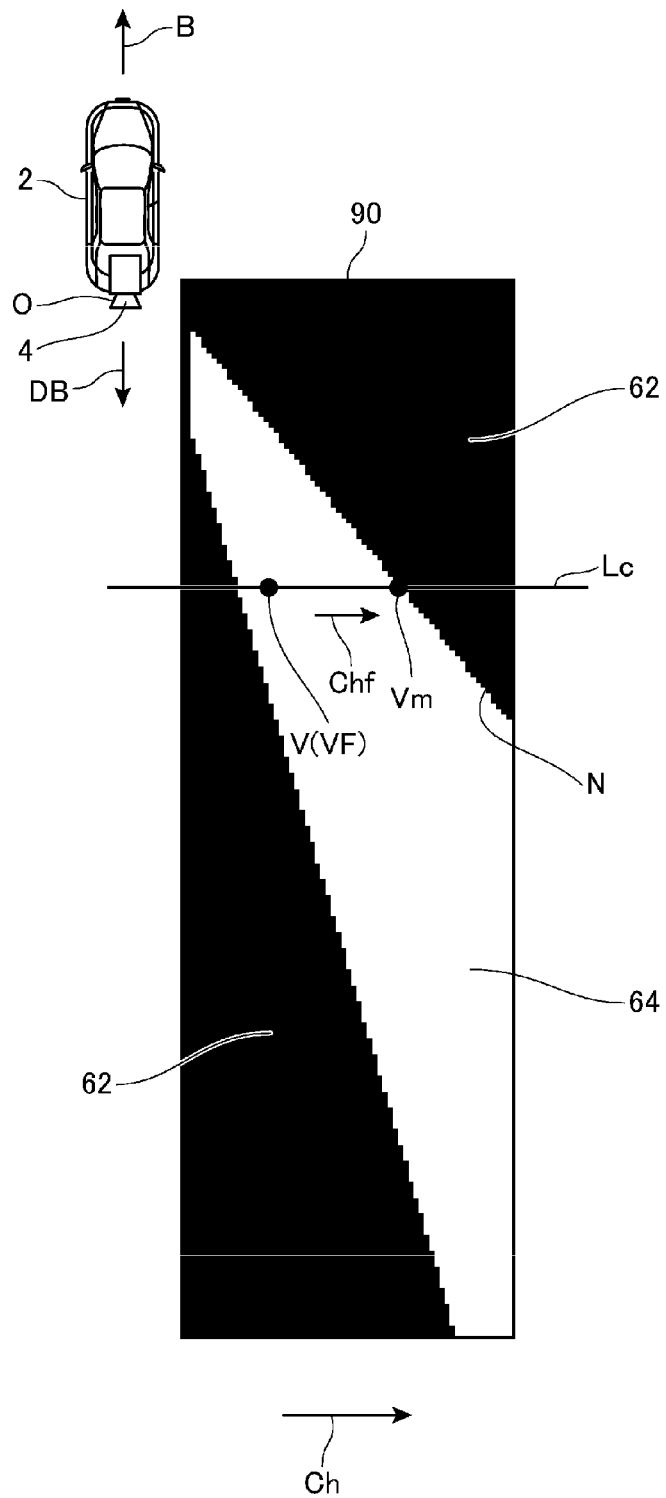

[FIG. 19 (A)] [FIG. 19 (B)]
[FIG. 19 (C)]
[FIG. 19 (D)]
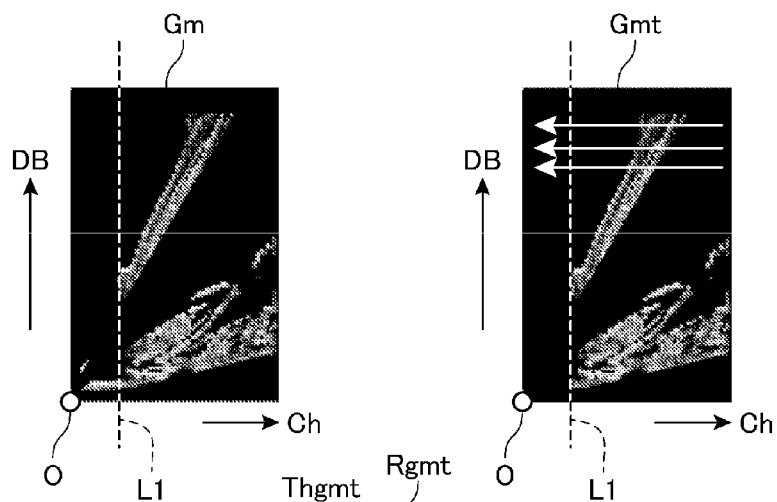
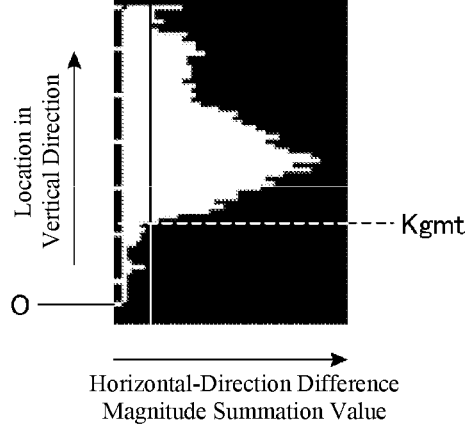
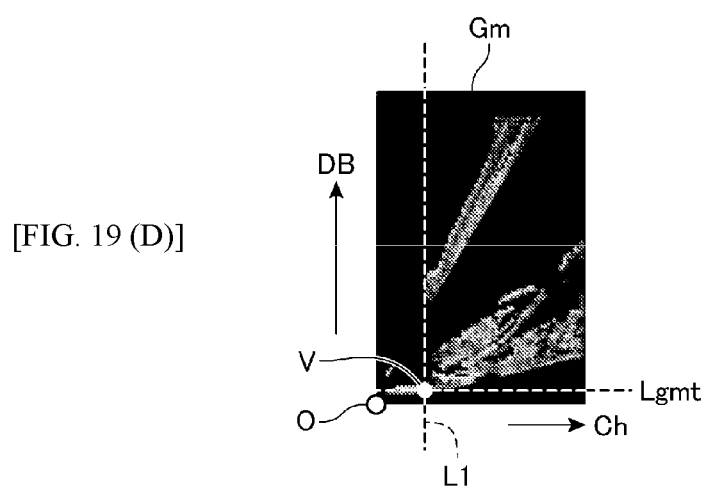

[FIG. 20]

| | Ordinary Vehicle | Large Bus | Motorcycle |
|---|---|---|---|
| Camera Video (Rear Camera) | | | |
| Overhead Image | | | |
| Mask Image | | | |

[FIG. 21]
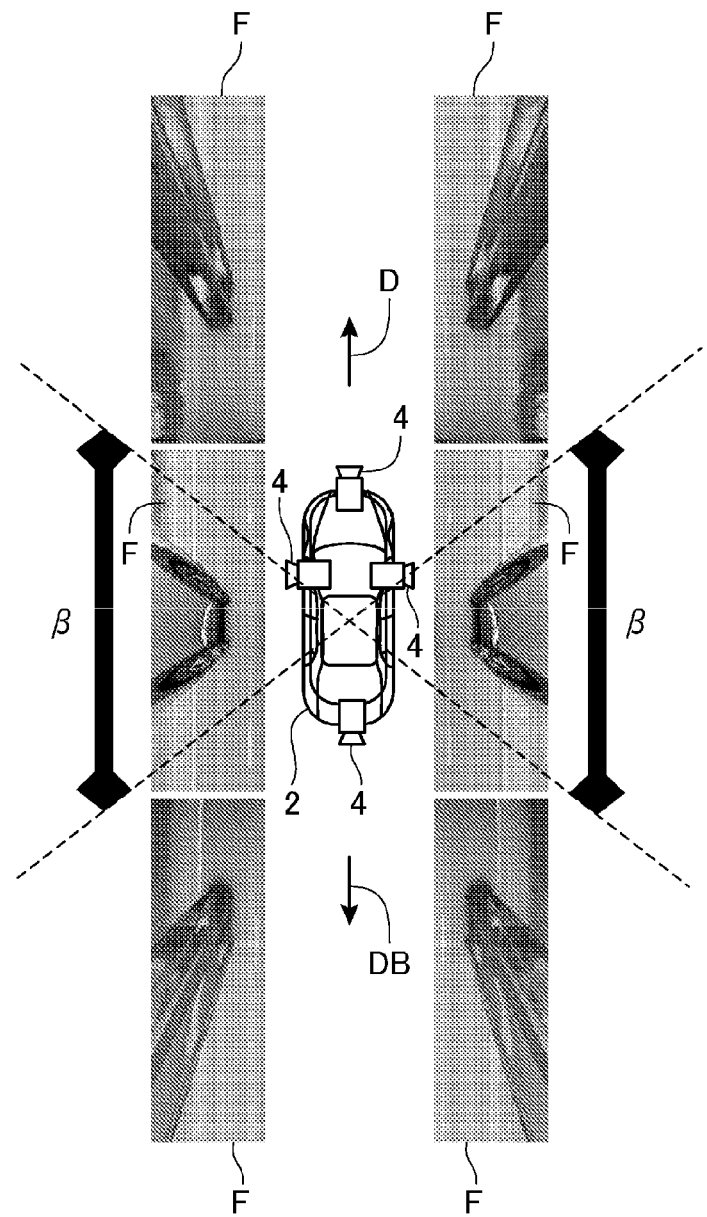

[FIG. 22]
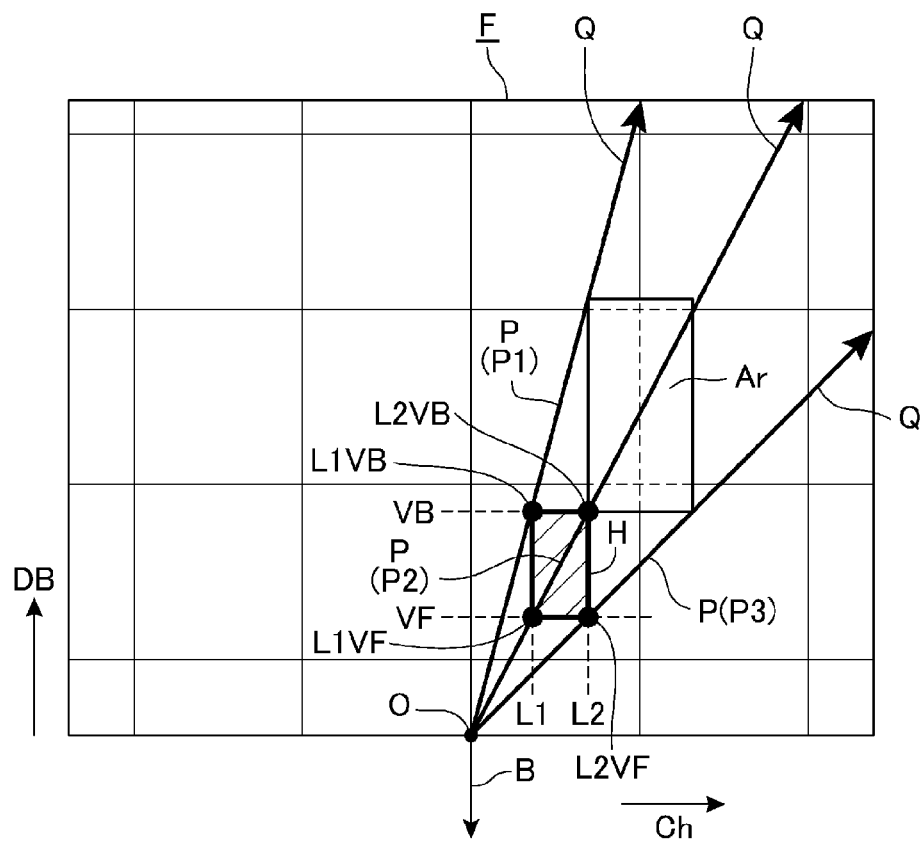

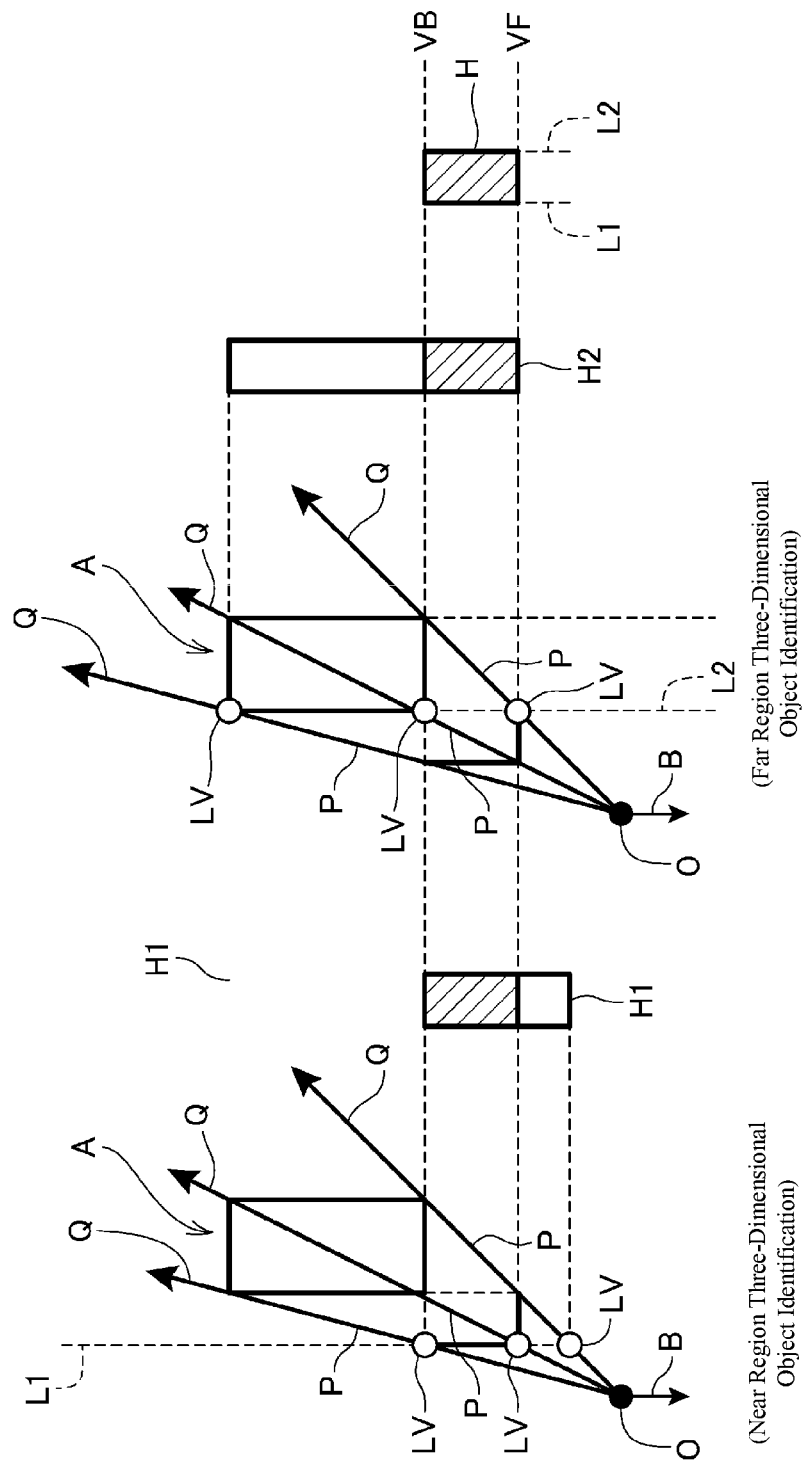
[FIG. 23]

[FIG. 24]
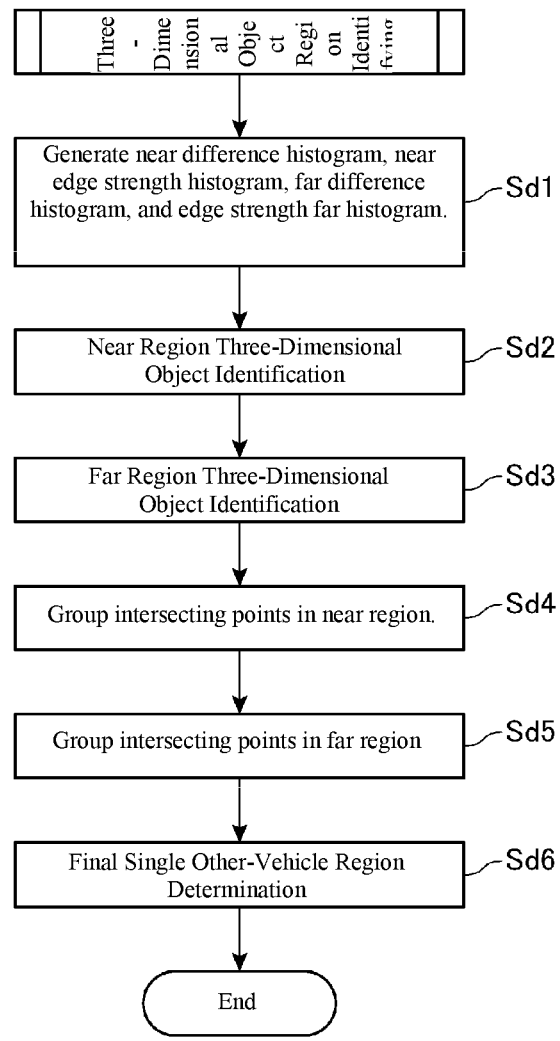

[FIG. 25 (A)]
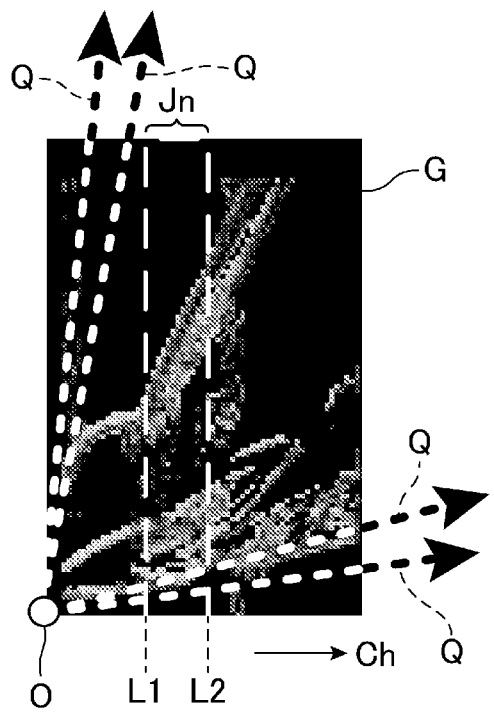
[FIG. 25 (B)]
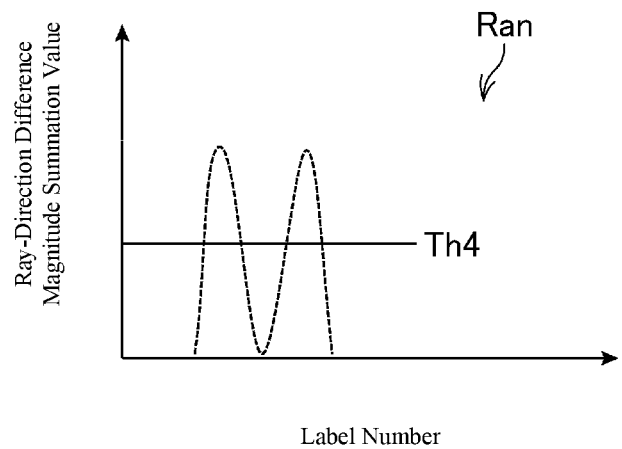

[FIG. 26 (A)]
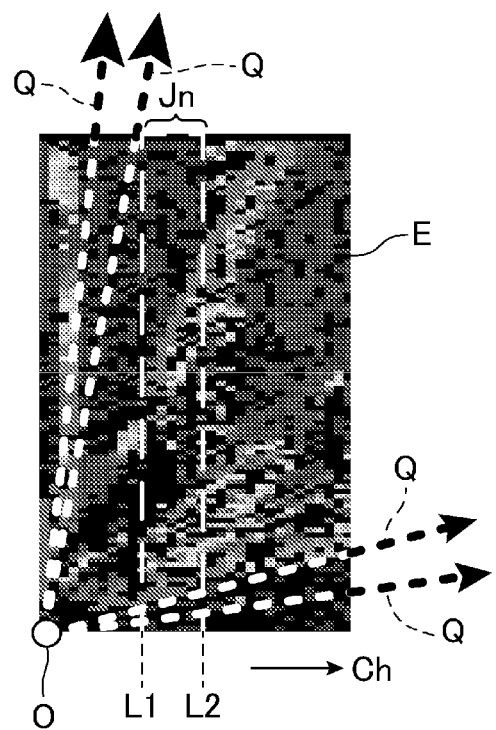
[FIG. 26 (B)]
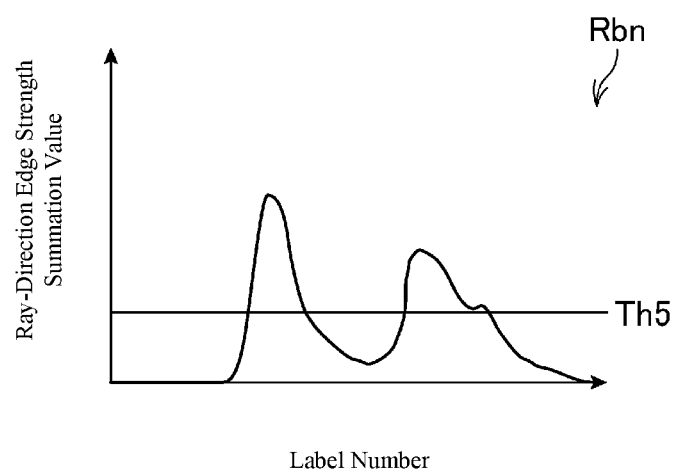

[FIG. 27 (A)]
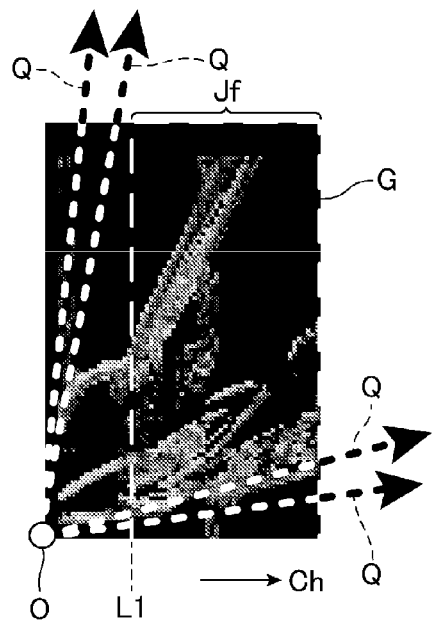
Calculate Summation Value
[FIG. 27 (B)]
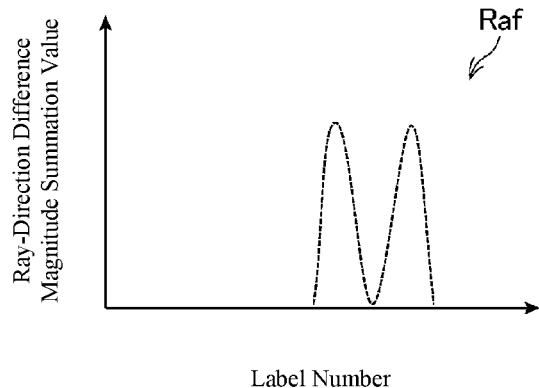

[FIG. 28 (A)]
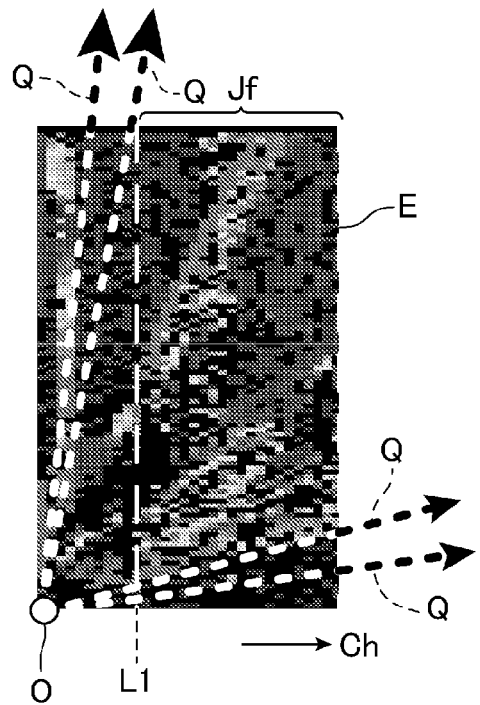
[FIG. 28 (B)]
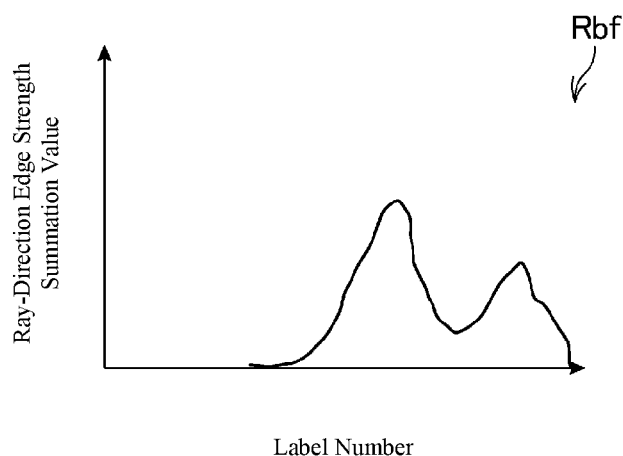

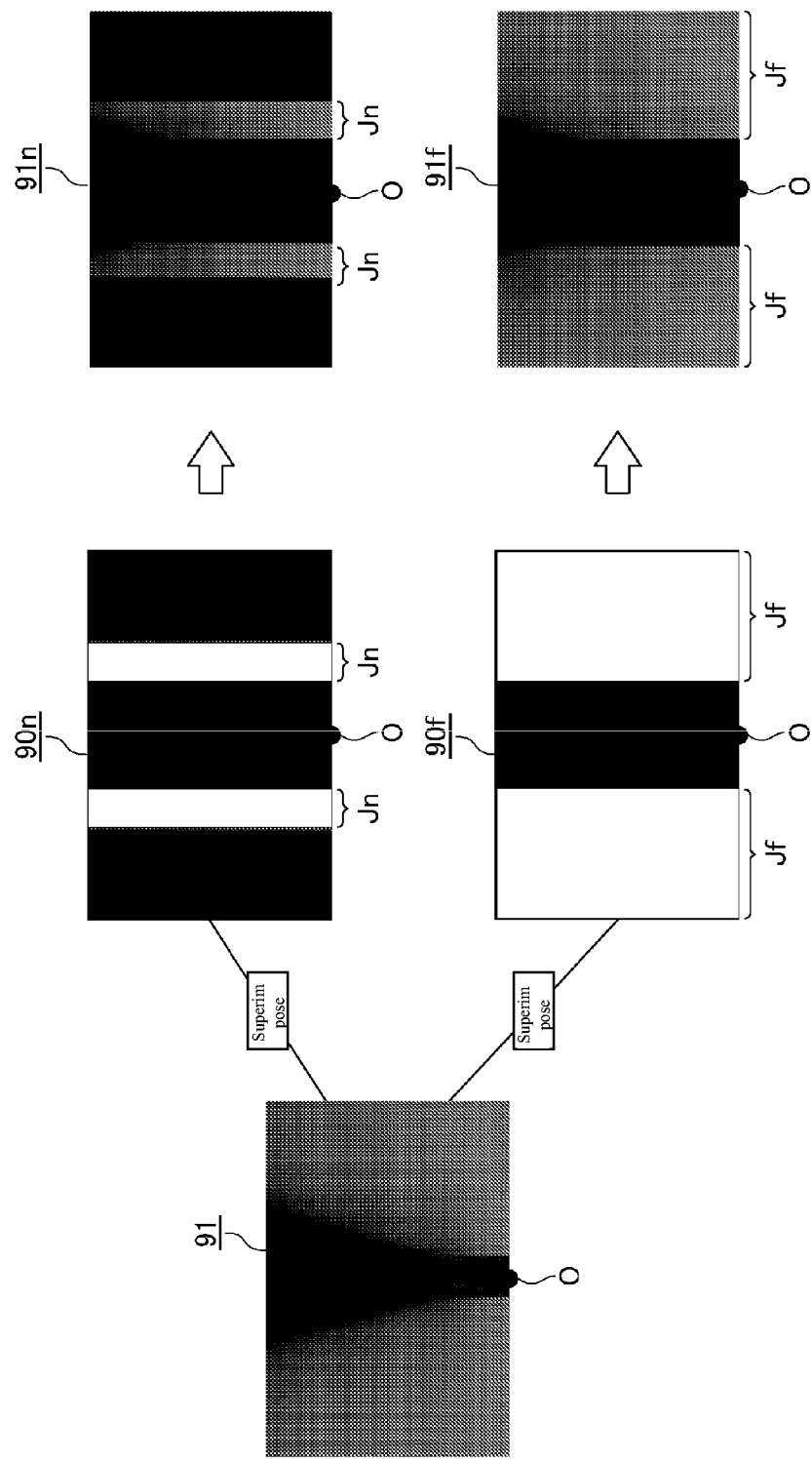
[FIG. 29]

[FIG. 30]
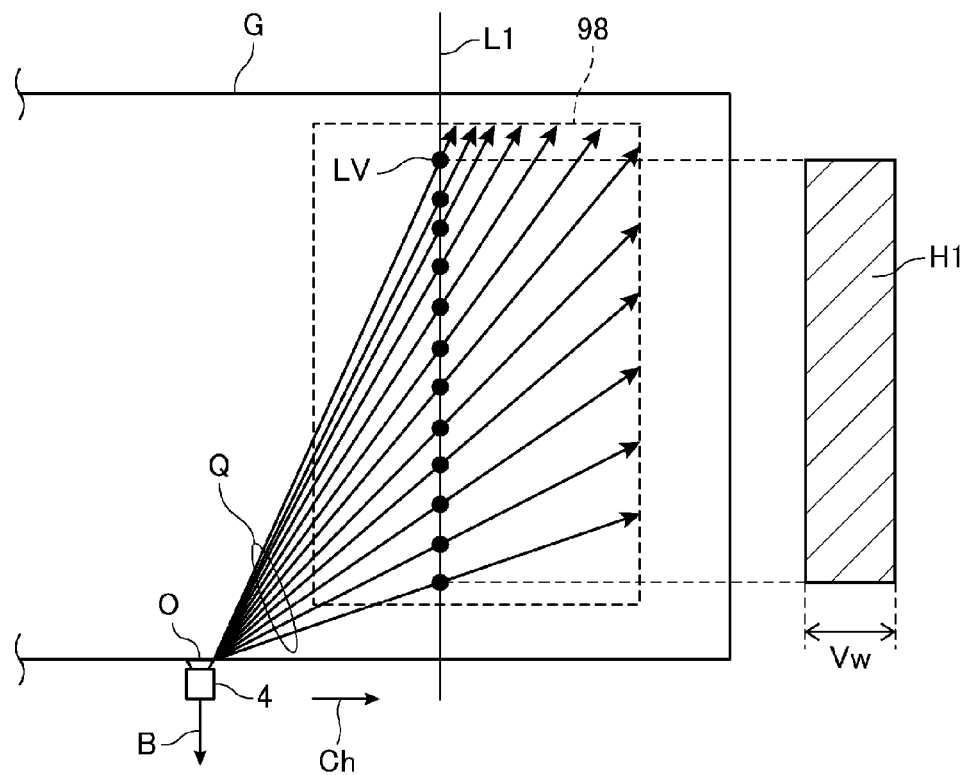

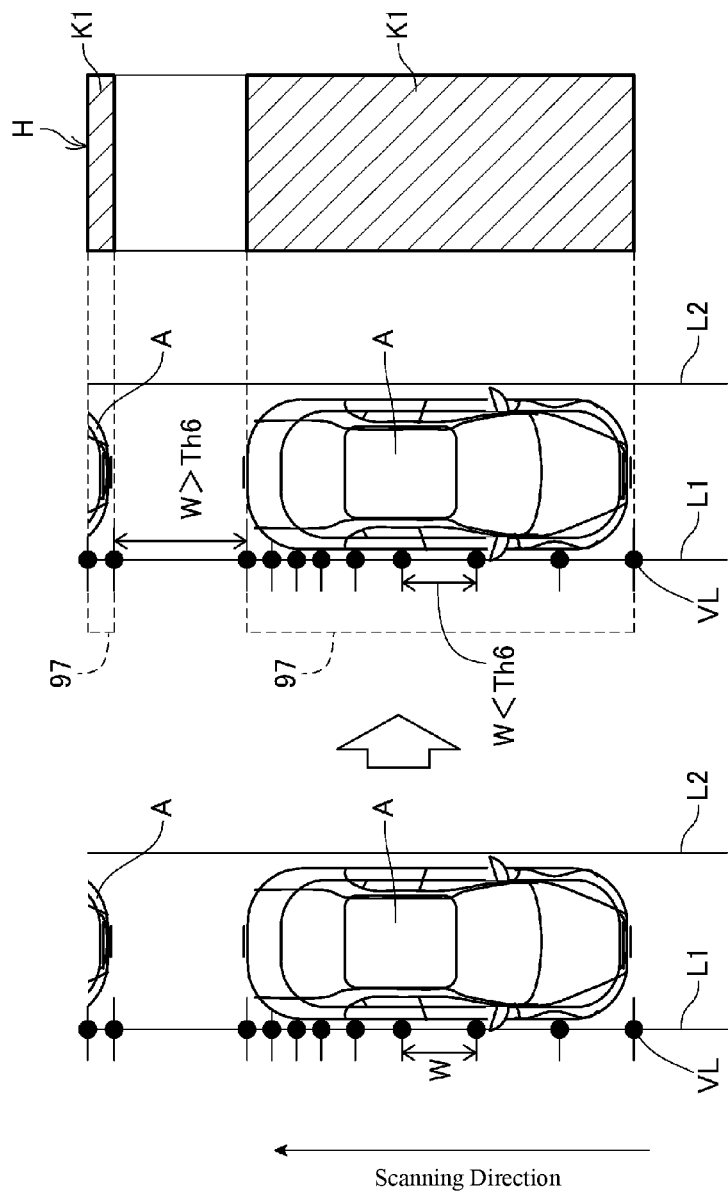
[FIG. 31]

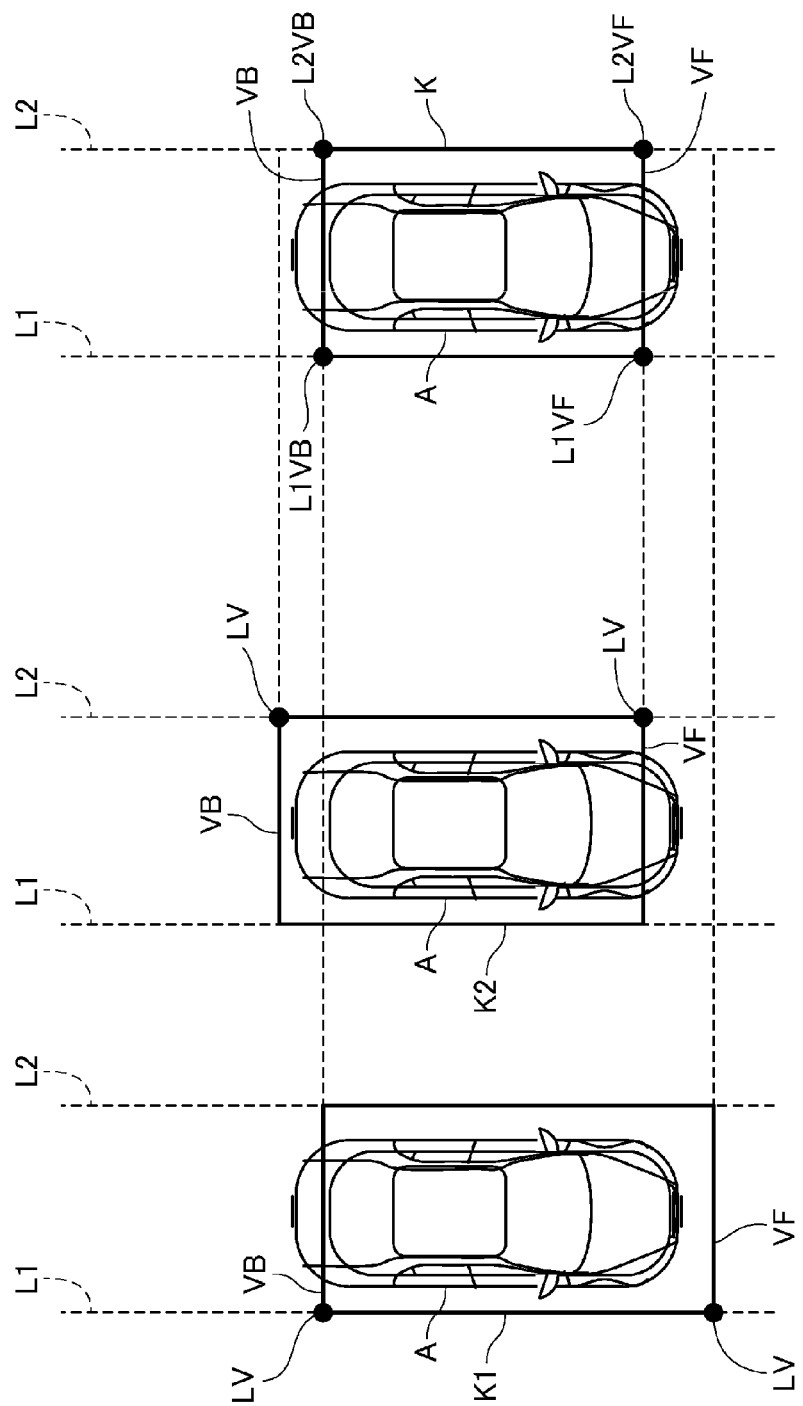
[FIG. 32]

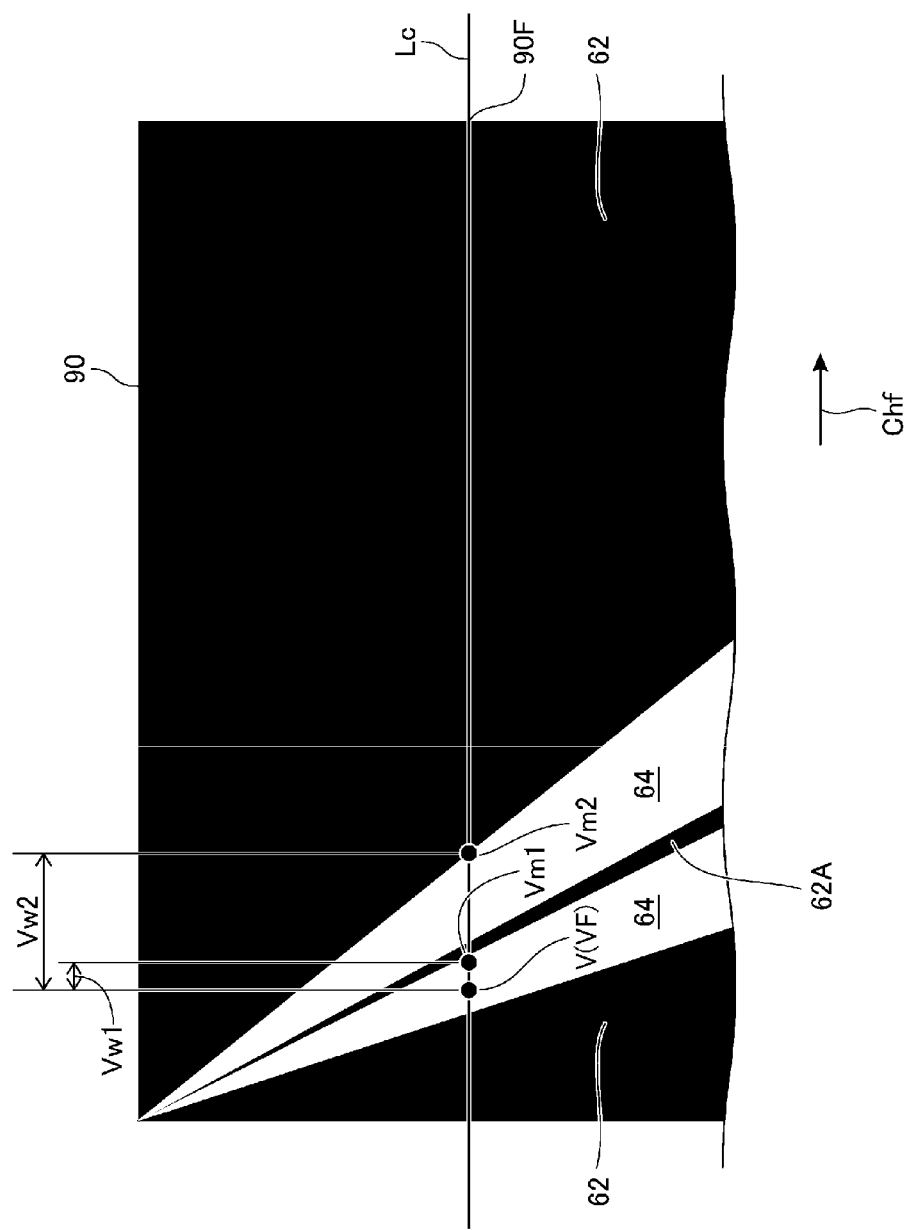
[FIG. 33]

[FIG. 34]
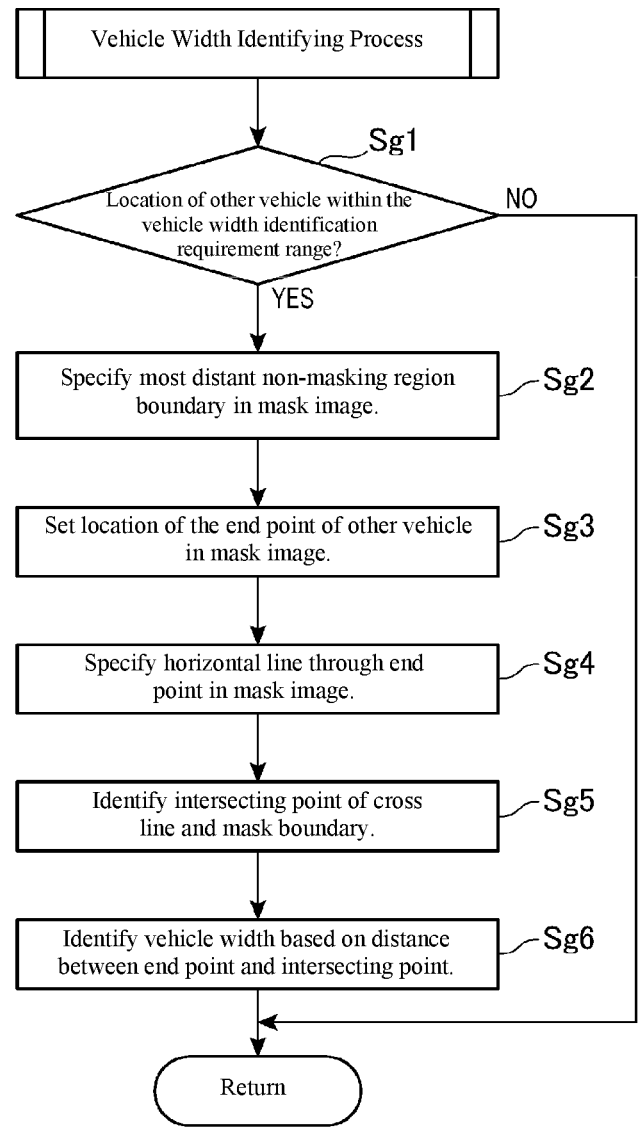

[FIG. 35]
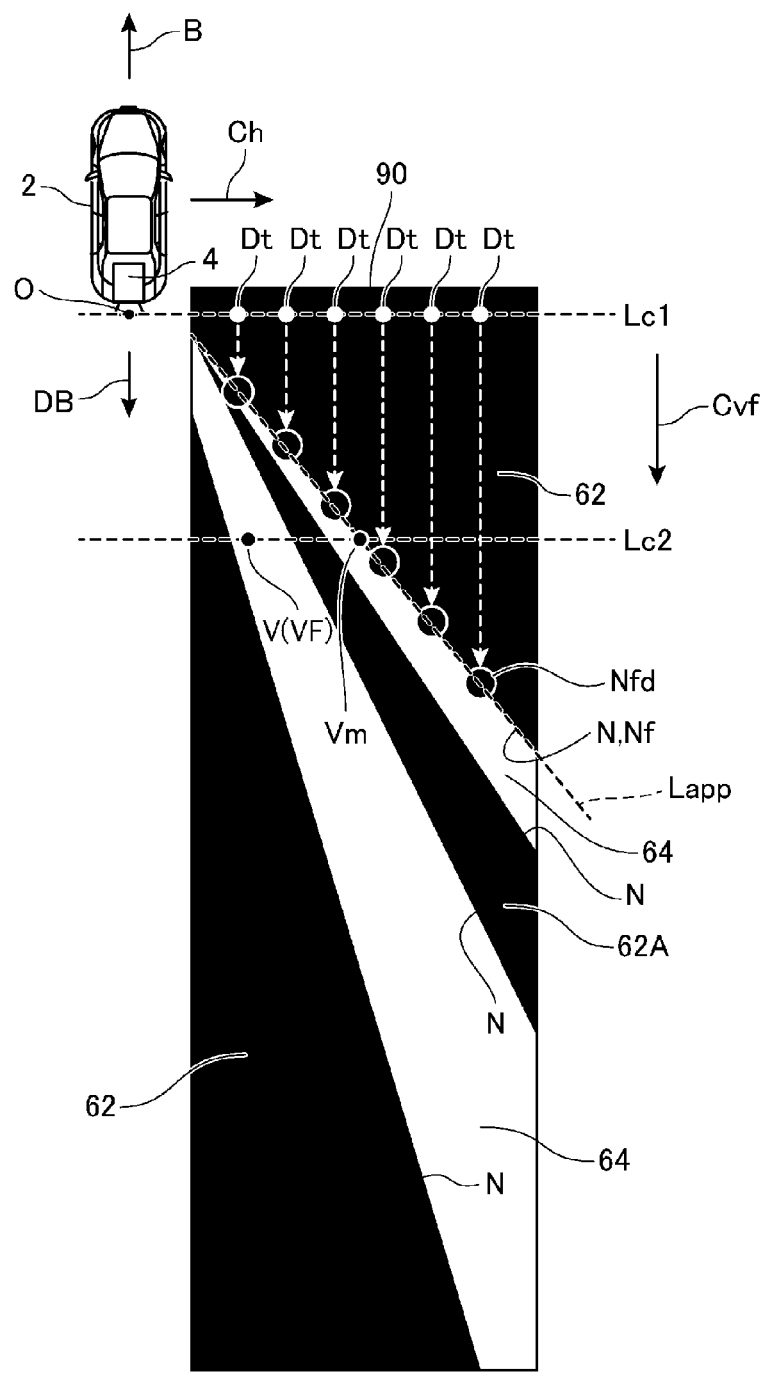

THREE-DIMENSIONAL-OBJECT DETECTION DEVICE, ON-VEHICLE SYSTEM, AND THREE-DIMENSIONAL-OBJECT DETECTION METHOD

BACKGROUND OF THE INVENTION

Field of the Invention

The present invention relates to a three-dimensional object detecting device, an on-vehicle system, and a three-dimensional object detecting method.

Description of the Related Art

There are known technologies for detecting three-dimensional objects, such as other vehicles in the surroundings of a vehicle, based on differences in overhead images (also termed "birds-eye view images") taken at different times (referencing, for example, Patent Document 1 and Patent Document 2). These technologies are applied to parking assist systems that issue warnings by detecting, as obstacles, three-dimensional objects, such as other vehicles, or the like, that are nearby when parking a vehicle, such as in Patent Document 1.

PRIOR ART DOCUMENTS

Patent Documents

Patent Document 1: Japanese Unexamined Patent Application Publication 2008-227646
Patent Document 2: International Patent Application Publication 2014/017521

SUMMARY OF THE INVENTION

Often shadows of structures, such as buildings and signs, traffic signals, and the like, appear on road surfaces, and these shadows are observed from a vehicle during travel as having relative movement. There has been a problem in that when these shadows exist between a traveling vehicle and a nearby three-dimensional object, the accuracy with which the three-dimensional object is detected will suffer.

The object of the present invention is to provide a three-dimensional object detecting device, on-vehicle system, and three-dimensional object detecting method able to improve the accuracy with which three-dimensional objects that are present in the surroundings of a vehicle during travel are detected.

Means for Solving the Problem

This specification incorporates the entirety of Japanese patent application 2020-024175, filed on Feb. 17, 2020, and Japanese Patent Application 2020-024176, also filed on Feb. 17, 2020.

One aspect of the present invention is a three-dimensional object detecting device comprising: an overhead view converting processing portion for converting, into a respective first overhead image and second overhead image, a first captured image and a second captured image captured by a camera at different times in a vehicle that is traveling; a difference image generating portion for generating a difference image between the first overhead image and the second overhead image, with the imaging locations thereof aligned to each other; a masked difference image generating portion for generating a mask image for masking all but a three-dimensional object candidate region that is a candidate for the appearance of a three-dimensional object in the difference image, and masking the difference image with the mask image to generate a masked difference image; a near ground contact line identifying portion for identifying a near ground contact line of a three-dimensional object in the difference image based on the masked difference image; a width identifying portion for finding an end point of the three-dimensional object based on the masked difference image, and for identifying the width of the three-dimensional object based on the distance between the end point of the three-dimensional object and a non-masking region boundary that is a boundary of a non-masking region in the mask image; a far ground contact line identifying portion for identifying a far ground contact line of the three-dimensional object in the difference image based on the width of the three-dimensional object and the near ground contact line; and a location identifying portion for identifying the location of the three-dimensional object in the difference image based on the near ground contact line and to the far ground contact line.

One aspect of the present invention is a three-dimensional object detecting device comprising: an overhead view converting processing portion for converting, into a respective first overhead image and second overhead image, a first captured image and a second captured image captured by a camera at different times in a vehicle that is traveling; a difference image generating portion for generating a difference image between the first overhead image and the second overhead image, with the imaging locations thereof aligned to each other; a masked difference image generating portion for generating a mask image for masking all but a three-dimensional object candidate region that is a candidate for the appearance of a three-dimensional object in the difference image, and masking the difference image with the mask image to generate a masked difference image; a near ground contact line identifying portion for identifying a near ground contact line of a three-dimensional object in the difference image based on the masked difference image; a width identifying portion for identifying the width of the three-dimensional object; a far ground contact line identifying portion for identifying a far ground contact line of the three-dimensional object in the difference image based on the width of the three-dimensional object and the near ground contact line; and a location identifying portion for identifying the location of the three-dimensional object in the difference image based on the near ground contact line and to the far ground contact line, wherein: the width identifying portion: finds an end point of the three-dimensional object based on the masked difference image; and identifies an intersecting point between a most distant non-masking region boundary that is a boundary of a non-masking region that is located most distant from the imaging location in the mask image, and a straight line that extends in the width direction of the three-dimensional object through an end point of the three-dimensional object that has been found based on the masked difference image, to identify the width of the three-dimensional object based on the distance between the end point and the intersecting point.

Effects of the Invention

The present invention enables an improvement in accuracy of detection of a three-dimensional object that is present in the surroundings of a vehicle during travel.

BRIEF DESCRIPTION OF THE DRAWINGS

FIG. 1 is a structural diagram of an on-vehicle system according to a first embodiment according to the present invention.

FIG. 2 is a diagram depicting the functional structure of a camera ECU.

FIG. 3 is a diagram depicting the positional relationship between a vehicle and another vehicle in the same embodiment.

FIG. 4 is a flowchart of a three-dimensional object detecting process.

FIG. 5(A) is a diagram for explaining a difference image generating operation and shows an example of a first overhead image and a second overhead image.

FIG. 5(B) is a diagram for explaining a difference image generating operation, and shows an example of a difference image.

FIG. 6 is a flowchart for a mask image generating process.

FIG. 7(A) is a diagram for explaining the inclination of a vertical contour line, and shows an example of a captured image.

FIG. 7(B) is a diagram for explaining the inclination of a vertical contour line, and shows an example of an overhead image.

FIG. 8 is a diagram depicting a label image schematically.

FIG. 9 is a diagram depicting a lookup table schematically.

FIG. 10(A) is a diagram for explaining the generation of a difference histogram, and shows an example of a difference image.

FIG. 10(B) is a diagram for explaining the generation of a difference histogram, and shows an example of a difference histogram.

FIG. 11(A) is a diagram for explaining the generation of an edge strength histogram, and shows an example of an edge image.

FIG. 11(B) is a diagram for explaining the generation of an edge strength histogram, and shows an example of an edge strength histogram Rb.

FIG. 12(A) is a diagram for explaining the generation of a mask image, and shows an example of a label image.

FIG. 12(B) is a diagram for explaining the generation of a mask image, and shows an example of a mask image.

FIG. 13 is an explanatory diagram for the operation for generating a masked difference image.

FIG. 14 is a flowchart for the near ground contact line identifying process.

FIG. 15(A) is a diagram for explaining the generation of a masked difference histogram, and shows an example of a masked difference image.

FIG. 15(B) is a diagram for explaining the generation of a masked difference image, and shows an example of a masked difference histogram obtained from the masked difference image of FIG. 15(A).

FIG. 16 is an explanatory diagram for the near ground contact line identifying operation.

FIG. 17 is a flowchart for a vehicle width identifying process.

FIG. 18 is an explanatory diagram for various types of parameters that are set for the mask image in the vehicle width identifying process.

FIG. 19(A) is an explanatory diagram for an operation for identifying the end points of another vehicle, based on a difference mask image, and shows an example of a difference mask image.

FIG. 19(B) is an explanatory diagram for an operation for identifying the end points of another vehicle, based on a difference mask image, and shows an example of a difference mask image for end point specification.

FIG. 19(C) is an explanatory diagram for an operation for identifying the end points of another vehicle, based on a difference mask image, and shows an example of a difference histogram for end point specification.

FIG. 19(D) is an explanatory diagram for an operation for identifying the end points of another vehicle, based on a difference mask image, and shows an example of an end point of the other vehicle in the difference mask image.

FIG. 20 is diagrams showing examples of camera images, overhead images, and mask images for a plurality of other vehicles.

FIG. 21 is an explanatory diagram for a vehicle width identifying requirement.

FIG. 22 is a diagram showing the relationships between near ground contact lines, far ground contact lines, and vertical contour lines in an overhead image.

FIG. 23 is a summary explanatory diagram for a three-dimensional object region identifying process.

FIG. 24 is a flowchart for a three-dimensional object region identifying process.

FIG. 25(A) is a diagram for explaining the generation of a near difference histogram, and shows an example of a difference image.

FIG. 25(B) is a diagram for explaining the generation of a near difference histogram, and shows an example of a near difference histogram.

FIG. 26(A) is a diagram for explaining the generation of a near edge strength histogram, and shows an example of an edge image.

FIG. 26(B) is a diagram for explaining the generation of a near edge strength histogram, and shows an example of a near edge strength histogram Rbn.

FIG. 27(A) is a diagram for explaining the generation of a far difference histogram, and shows an example of a difference image.

FIG. 27(B) is a diagram for explaining the generation of a far difference histogram, and shows an example of a far difference histogram.

FIG. 28(A) is a diagram for explaining the generation of a far edge strength histogram, and shows an example of an edge image.

FIG. 28(B) is a diagram for explaining the generation of a far edge strength histogram, and shows an example of a far edge strength histogram.

FIG. 29 is an explanatory diagram of a near mask label image of a far mask label image.

FIG. 30 is an explanatory diagram for an other-vehicle region identifying operation when three-dimensional object detection is carried out limited to a near region.

FIG. 31 is an explanatory diagram of an operation for grouping the intersecting points in a near ground contact line.

FIG. 32 is an explanatory diagram for an operation for determining a final single other-vehicle region.

FIG. 33 is an explanatory diagram for a vehicle width identifying process, relating to a modified example of the first embodiment.

FIG. 34 is a flowchart for a vehicle width identifying process according to a second embodiment according to the present invention.

FIG. 35 is an explanatory diagram for various types of parameters that are set for a mask image in the vehicle width identifying process of the same embodiment.

DETAILED DESCRIPTION OF THE INVENTION

Embodiments according to the present invention will be explained below in reference to the drawings.

First Embodiment

FIG. 1 is a diagram depicting the structure for an on-vehicle system 1 according to a first embodiment.

The on-vehicle system 1 is a system that is installed in a vehicle 2, and comprises an imaging portion 3, a camera ECU 6, a vehicle control unit 8, an HMI portion 9, and a CAN 10. The CAN 10 is a type of on-vehicle network for connecting the camera ECU 6, the vehicle control unit 8, and the HMI portion 9.

The imaging portion 3 outputs, to the camera ECU 6, a camera video 5 that is acquired through imaging the entire periphery of the vehicle 2 (in a 360° range). The imaging portion 3 comprises a plurality of cameras 4, being a front camera for imaging toward the front of the vehicle 2, a rear camera for imaging rearward DB (FIG. 3), a right side camera for imaging toward the right side, and a left side camera for imaging toward the left side, where the camera video 5 is outputted from each of the cameras 4. Note that in the present embodiment the vehicle 2 is assumed to be traveling forward, where the front of the vehicle 2 matches the travel direction B.

The camera ECU 6 is a device provided with a function for controlling the imaging operations of the imaging portion 3 and functions for carrying out necessary signal processing on each of the camera videos 5. The camera ECU 6 according to the present embodiment functions also as an other-vehicle detecting device (three-dimensional object detecting device) for detecting, for each of the camera videos 5 of each of the cameras 4, the locations of other vehicles A (FIG. 3), which are three-dimensional objects that are traveling in parallel with the vehicle 2, and for transmitting location information for the other vehicles A to the vehicle control unit 8 through the CAN 10. The details of the camera ECU 6 will be described below.

The vehicle control unit 8 is a unit comprising a processor for executing various types of control relating to travel of the vehicle 2, and is equipped with functions for controlling the various portions of the vehicle 2, such as the steering mechanism, the driving mechanism, and the like, to perform such a control. Moreover, the vehicle control unit 8 is equipped with one or more sensors for detecting various types of vehicle information (including at least the travel speed) that is required in this control.

Furthermore, the vehicle control unit 8 is equipped with functions for controlling the operation of the vehicle 2 instead of operations by the driver (so-called "automatic driving control functions"), and while the vehicle 2 is traveling, sequentially acquires locations of three-dimensional objects that are present in the surroundings of the vehicle 2, to perform driving control so as to ensure that there will be appropriate distances from the three-dimensional objects. For example, when there is the possibility that the vehicle 2 will approach another vehicle A (which is an example of a three-dimensional object), such as when changing lanes, when merging, when branching, or the like, the vehicle control unit 8 acquires the locations of other vehicles A, and, based on the locations of the other vehicles A, carries out driving control so as to ensure appropriate between-vehicle distances from the other vehicles A.

Note that the vehicle control unit 8 may also be equipped with a driving assisting function for assisting the operations by the driver, instead of the automatic driving controlling function or in addition to the automatic driving controlling function. The driving assisting function assists the operation by the driver when the vehicle 2 is traveling, doing so through sequentially acquiring the locations of the three-dimensional objects that are present in the surroundings of the vehicle 2 and providing guidance to the driver regarding the three-dimensional objects or issuing various types of warnings based on the locations of the three-dimensional objects.

The HMI portion 9 comprises an input device and an output device, which forms a user interface, where the output device comprises a display device 9A for displaying various types of information and a speaker for outputting various types of audio. The camera videos 5 of the various cameras 4, an image that shows the vehicle 2 in an overhead view from above, and the like are displayed on the display device 9A, and information regarding other vehicles A (such as the locations, sizes, and the like of the other vehicles A), detected by the camera ECU 6, is also displayed in an appropriate form.

The camera ECU 6 referenced above is equipped with a "computer" that comprises a CPU 12 (which is an example of a processor), a memory 14 (such as a ROM or a RAM, or the like) for storing various types of information, such as a program 13, and a CAN interface 16, as a communication circuit module for communicating with the vehicle control unit 8 through the CAN 10. The camera ECU 6 in the present embodiment functions as the device for detecting other vehicles, described above, through the CPU 12 executing a program that is stored in the memory 14.

FIG. 2 is a diagram depicting the functional structure of the camera ECU 6. The camera ECU 6 according to the present embodiment acquires, from the camera video 5, a first captured image and a second captured image, imaged at different times by the same camera 4, and, based on a difference image G, which is the difference between a first overhead image F1 and a second overhead image F2, in which the first captured image and the second captured image have been converted into overhead views, detects the location of another vehicle A that appears in the camera video 5 of the camera 4. The camera ECU 6 detects the locations of other vehicles A around the entire periphery of the vehicle 2 by carrying out this detection for each camera video 5 of each of the cameras 4. The camera ECU 6, as illustrated in FIG. 2, comprises a vehicle information acquiring portion 20, a preprocessing portion 22, and a three-dimensional object location identifying portion 24, to perform this detection operation.

The vehicle information acquiring portion 20 acquires vehicle information from the vehicle control unit 8. This vehicle information includes at least the travel speed of the vehicle 2.

The preprocessing portion 22 is that which executes a process for acquiring the difference image G from the camera video 5, and comprises a camera video acquiring portion 30, a brightness converting processing portion 32, an overhead view converting processing portion 34, and a difference image generating portion 36.

The camera video acquiring portion 30 controls the imaging portion 3 to continue imaging, by the imaging portion 3, across no less than a prescribed time interval, to acquire a camera video 5 obtained through that imaging.

The brightness converting processing portion 32 converts, into a brightness image, each frame (captured image) that structures the camera video 5. An individual frame corresponds to a captured image that is a still image, where the brightness image is an image wherein each pixel value of the captured image is converted into a brightness value for that pixel.

The overhead view converting processing portion 34 converts each brightness image into an overhead image. The overhead image is an image that is viewed straight down from a virtual viewpoint that is set above the vehicle 2. The overhead view converting processing portion 34 generates an overhead image through projection conversion (also known as "viewpoint conversion").

The difference image generating portion 36 extracts, from the overhead images that are generated sequentially by the overhead view converting processing portion 34, a first overhead image F1 and a second overhead image F2 (referencing FIG. 5 (A)) obtained from two images, a first captured image and a second captured image, captured at different times, to generate a difference image G between the two. The difference image G is an image wherein the pixel values (brightness values) of each of the pixels of the first captured image E1 are converted into differences from the pixel values (brightness values) of the pixels of the second captured image E2 that correspond to those pixels, with the pixel values for each of the pixels binarized with a prescribed threshold value. When generating the difference image G, the difference image generating portion 36 generates the difference image G by calculating difference magnitudes between the pixel values for each of the pixels in the first overhead image F1 and the second overhead image F2 in a state wherein the imaging locations O thereof are aligned in reference to the first overhead image F1.

The three-dimensional object location identifying portion 24 is that which identifies the location of another vehicle A (which is an example of a three-dimensional object) based on the difference image G, and comprises a masked difference image generating portion 50, a near ground contact line identifying portion 51, a vehicle width identifying portion 52, a far ground contact line identifying portion 53, and a location identifying portion 54.

The masked difference image generating portion 50 generates a mask image 90 wherein the remaining region of the difference image G, with the exception of other-vehicle candidate regions 60, is masked, to generate a masked difference image Gm (referencing FIG. 13) that is masked, except for the other-vehicle candidate regions 60, through masking the difference image G by the mask image 90.

An other-vehicle candidate region 60 is a region in the difference image G wherein there is a high probability that another vehicle A appears, a region that is a candidate to be an other-vehicle region H. An other-vehicle region H is a region (a three-dimensional object region) wherein the appearance of another vehicle A in the difference image G has been confirmed.

The near ground contact line identifying portion 51 identifies a near ground contact line L1 in the difference image G based on the masked difference image Gm.

Here a "ground contact line" refers to a line wherein another vehicle A that is present in another lane that is adjacent to the lane wherein the vehicle 2 is traveling contacts the ground, and corresponds to contour lines 63 (FIG. 3) on both the left and right sides of the other vehicle A in the plan view.

In the present embodiment, as illustrated in FIG. 3, of the contour lines 63 on both the left and right sides of the other vehicle A, the line on the near side of the vehicle 2 is termed the "near ground contact line L1," and the line on the far side of the vehicle 2 is termed the "far ground contact line L2."

The location of the other-vehicle region H in the crosswise direction Ch, when viewed from the vehicle 2, in the difference image G is specified by setting the near ground contact line L1 and the far ground contact line L2 in the difference image G. Note that the "crosswise direction Ch" indicates the direction that is perpendicular to the direction of travel B of the vehicle 2.

The vehicle width identifying portion 52 identifies the vehicle width Vw (FIG. 3) of the other vehicle A based on the mask image 90 (FIG. 13).

The far ground contact line identifying portion 53 identifies the far ground contact line L2 in the difference image G based on the near ground contact line L1 and the vehicle width Vw.

The location identifying portion 54 identifies a single other-vehicle region K in the difference image G based on the near ground contact line L1, the far ground contact line L2, and the front end VF and back end VB (FIG. 3) of the other vehicle A. The single other-vehicle region K is a region occupied by a single other vehicle A (that is, a region where the other vehicle A appears) in the difference image G.

Describing in detail, when a plurality of other vehicles A are traveling in parallel, there is the possibility that a single region that includes a plurality of other vehicles A will be identified as the other-vehicle region H. A single other-vehicle region K corresponds to a region wherein this other-vehicle region H is divided for each individual other vehicle A, where the location identifying portion 54 ultimately identifies single other-vehicle regions K instead of the other-vehicle region H.

Additionally, the location identifying portion 54 identifies the locations of the other vehicles A in real space based on the locations of the single other-vehicle regions K in the difference image G, and sequentially transmits these locations to the vehicle control unit 8. The conversion from the location of the single other-vehicle region K into the location of the other vehicle A in real space may use an appropriate technique that is publicly known or well-known.

Additionally, the location identifying portion 54 transmits, to the HMI portion 9, data for displaying information on the location of the other vehicle A in real space, to display this information on the display device 9A. The form of this display may be a form wherein, for example, the contour lines of the single other-vehicle region K are displayed superimposed on an image that is an overhead view from above the vehicle 2. In the present embodiment, an actual measured value, identified by the vehicle width identifying portion 52 based on the mask image 90, is used for the vehicle width Vw of the other vehicle A rather than using a preset value that has been set in advance, enabling the location of the other vehicle A (the region occupied by the other vehicle A) to be displayed more accurately.

The operation by the camera ECU 6 to detect the other vehicle A will be explained next.

In this explanation of the operation, a case wherein the camera ECU 6 detects another vehicle A that appears in the camera video 5 of the rear camera will be used as an example. Additionally, in this operation explanation, it is assumed that other lanes 70R and 70L exist on both sides adjacent to the lane 70 wherein the vehicle 2 is traveling, and that other vehicles A are traveling in the same direction as the vehicle 2 (that is, are traveling in parallel), in each of the lanes 70R and 70L, as illustrated in FIG. 3. Moreover, all of the other vehicles A are located rearward DB of the vehicle 2, and located within the range of the field angle α of the rear camera. Note that in FIG. 3 the region marked by the rectangle indicates the detection region 72 for detecting the presence of another vehicle A in automatic driving control and driving assistance by the vehicle control unit 8.

FIG. 4 is a flowchart of the three-dimensional object detecting process.

The three-dimensional object detecting process is executed repeated continuously by the camera ECU 6 for each camera video 5 of each camera 4 in order to detect the presence of another vehicle A in the surroundings, at least when the vehicle 2 is traveling.

In the three-dimensional object detecting process, first the vehicle information acquiring portion 20 acquires vehicle information (including at least the travel speed) (Step Sa1), and the camera video acquiring portion 30 acquires a camera video 5 (Step Sa2).

Following this, the brightness converting processing portion 32 converts each frame (captured image) of the camera video 5 sequentially into a brightness image (Step Sa3), and the overhead view converting processing portion 34 sequentially generates overhead images F based on the individual brightness images (Step Sa4).

The difference image generating portion 36 then extracts, from the overhead images generated sequentially by the overhead view converting processing portion 34, a first overhead image F1 and a second overhead image F2, obtained from two images (a first captured image and a second captured image), taken at different times, to generate a difference image G for the two (Step Sa5).

FIG. 5 is diagrams for explaining the difference image generating operation, wherein FIG. 5 (A) shows an example of a first overhead image F1 and a second overhead image F2, and FIG. 5 (B) shows an example of a difference image G.

Note that in the below the captured image that was captured most recently shall be termed the "first captured image," and the captured image that was captured prior to that shall be termed the "second captured image."

In the first captured image and the second captured image, the imaging locations O thereof are offsetted in the travel direction B, so an offset DE, caused by movement of the vehicle 2, is produced in the imaging locations O in the first overhead image F1 and the second overhead image F2, as depicted in FIG. 5 (A). To correct the offset DE of the imaging locations O in generating the difference image G, the difference image generating portion 36 generates the difference image G between the two in a state wherein the imaging locations O of both the first overhead image F1 and the second overhead image F2 are aligned in reference to one or the other (being the first overhead image F1 in the case in FIG. 5 (A)).

Specifically, the difference image generating portion 36 calculates the travel distance of the vehicle 2 based on the travel speed of the vehicle 2 and the time difference to in the timing with which the first captured image and the second captured image were captured. Given this, the difference image generating portion 36 shifts each of the pixels of the first overhead image F1 or the second overhead image F2 (which, in FIG. 5 (A), is the second overhead image F2, having the earlier imaging timing) along the travel direction B by a number of pixels that depends on the travel distance. Through this a state is produced wherein the imaging locations O of both are aligned in reference to the other overhead image (the first overhead image F1 or the second overhead image F2).

When an arbitrary stationary object, such as a white line 74, or the like (which is one type of road surface marker), appears in both the first overhead image F1 and the second overhead image F2, then by aligning the imaging locations O of both images, the locations wherein the stationary object will appear will be aligned, as depicted in FIG. 5 (A).

On the other hand, when another vehicle A, which is a moving object, appears in both the first overhead image F1 and the second overhead image F2, then aligning the imaging locations O of both images will produce a shift in the location of the other vehicle A that appears in both, as depicted in FIG. 5 (A).

Through this, in the difference image G that shows the differences between the two, the pixel values (difference magnitudes) will be small in the regions wherein the stationary objects that are road surface markers (white lines 74, and like) appear, and the pixel values (difference magnitudes) will be relatively large in the regions wherein other vehicles A appear, as depicted in FIG. 5 (B). Consequently, setting an appropriate threshold value for the brightness value used in binarizing the difference image G makes it possible to acquire, as a difference image G, an image that excludes stationary objects. Given this, in the difference image G an other-vehicle region H wherein another vehicle A appears can be identified based on a region wherein the brightness values are high.

However, when a shadow 76 is produced, between the vehicle 2 and another vehicle A, by an arbitrary moving object, such as the vehicle 2 or another vehicle A, as illustrated in FIG. 3, described above, the pixel values in the difference image G will also be high in the region corresponding to the shadow 76. Because of this, if the location identifying portion 54 were to simply extract, as other-vehicle regions H, those regions in the difference image G wherein the pixel values are large, regions corresponding to shadows 76 would be included in the other-vehicle regions H, causing poor accuracy of the other-vehicle regions H.

Given this, in the present embodiment first, prior to the location identifying portion 54 identifying an other-vehicle region H based on the difference image G, the masked difference image generating portion 50 generates a masked difference image Gm wherein those regions in the difference image G other than other-vehicle candidate regions 60, that is, those regions corresponding to noise, such as shadows 76, and the like, are masked, as illustrated in FIG. 4, described above (Step Sa6: masked difference image generating process). Given this, the near ground contact line identifying portion 51 identifies the near ground contact line L1, which is one line for defining an other-vehicle region H, based on the masked difference image Gm (Step Sa1: near ground contact line identifying process). This enables accurate identification of the near ground contact line L1.

FIG. 6 is a flowchart for the mask image generating process, described above.

In the mask image generating process, first the masked difference image generating portion 50 generates a mask image 90 (Step Sb1). The mask image 90 is an image that masks a masking region 62 in the difference image G. The masking region 62 is the region in the difference image G that is not an other-vehicle candidate region 60. The masked difference image generating portion 50 identifies the other-vehicle candidate region 60 based on the vertical contour lines P of the other vehicle A that appear in the difference image G.

FIG. 7 is diagrams for explaining the inclination of the vertical contour lines P, wherein (A) shows an example of a captured image M and (B) shows an example of an overhead image F.

A vertical contour line P, as depicted in FIG. 7 (A) is a line that extends in the vertical direction in real space (the direction perpendicular to the surface of the ground), from among the contour lines 63 of the other vehicle A that appears in the captured image M (a frame of the camera video 5), the contour lines of the vehicle body parts (doors, etc.) of the other vehicle A, the contour lines of patterns that are painted on the other vehicle A, and the like. Accompanying projection conversion (viewpoint conversion) of the captured image M, the vertical contour lines P of the captured image M are converted into rays Q that extend in the radial direction from the imaging location O of the camera 4 (which, in this explanation of operations, is the rear camera) in the overhead image F (termed "inclination of the vertical contour lines P"), as depicted in FIG. 7 (B). That is, in the overhead image F, a region that is partitioned by the rays Q that include the vertical contour lines P in line segments (the regions indicated by hatching in FIG. 7 (B)), indicates a region wherein another vehicle A exists, and thus the region is an other-vehicle candidate region 60. Note that the direction of a ray Q wherein the vertical contour line P is included in a line segment is also termed the direction of inclination of the three-dimensional object through projection conversion (viewpoint conversion).

As with the overhead image F, in the difference image G that is a difference between two overhead images F, the vertical contour lines P are line segments of rays Q. In the difference image G, the individual pixels that structure a ray Q that includes a vertical contour line P will have pixel values (difference magnitudes) that are greater than those of other pixels. Based on this, the masked difference image generating portion 50 identifies an other-vehicle candidate region 60 based on each of the pixel values of the difference image G. Moreover, the masked difference image generating portion 50 uses label images 91 and a lookup table 92 to specify the other-vehicle candidate region 60 efficiently.

FIG. 8 is a diagram depicting a label image 91 schematically.

The label image 91 is an image of a plurality of rays Q, identified by respective label numbers, that extend radially, with equal spacing, from the imaging location O, where each of the rays Q is a candidate for a ray Q that includes a vertical contour line P in the difference image G. In the present embodiment, 100 rays Q, from label number "1" to "100," are included in the label image 91.

This label image 91 has a number of pixels that corresponds to the difference image G, and, as illustrated in FIG. 8, label numbers for the rays Q (from "1" to "100") are assigned corresponding to the individual pixels that structure the ray Q.

FIG. 9 is a diagram depicting a lookup table 92 schematically.

The lookup table 92 is that which designates, for each pixel in the label image 91, either "255," which corresponds to a non-masked (white) or "0," which corresponds to masked (black). A mask image 90, wherein each pixel is in a non-masked state (white) or a masked state (black), is produced by setting the pixel values for each of the pixels in the label image 91 based on the designation in the lookup table 92.

As illustrated in FIG. 9, in the lookup table 92 pixel values for the ray Q are designated for each label number for a ray Q. The pixel values are determined based on the pixel values for each ray Q in the difference image G.

The masked difference image generating portion 50, in the mask image generating process (FIG. 6: Step Sb1), first initializes all of the pixel values for the label image 91 to "255" (a non-masked state) or "0" (a masked state) (Step Sb1A). Next the masked difference image generating portion 50 generates the lookup table 92 based on the pixel values for the individual rays Q in the difference image G (Step Sb1B). Specifically, the masked difference image generating portion 50 determines a flag ("0" or "255") that indicates the brightness value for each pixel for each ray Q in the lookup table 92 based on a difference histogram Ra and an edge strength histogram Rb.

FIG. 10 is diagrams for explaining generation of the difference histogram Ra, wherein FIG. 10 (A) shows an example of a difference image G and FIG. 10 (B) shows an example of a difference histogram Ra obtained from the difference image G that is depicted in FIG. 10 (A).

The difference histogram Ra, as depicted in FIG. 10 (B) is a graph that has label numbers as the horizontal axis and has, as the vertical axis, values that sum whether or not there are pixel values for each of the rays Q in the difference image G that is depicted in FIG. 10 (A) (where, in the below, this shall be termed "ray-direction difference magnitude summation value"). The ray-direction difference magnitude summation value will be large when the ray Q includes a vertical contour line P, and thus, in this difference histogram Ra, it is possible to identify a range Ua of rays Q that are an other-vehicle candidate region 60, through identifying each ray Q wherein the ray-direction difference magnitude summation value exceeds a prescribed first threshold value Th1.

Additionally, identifying the rays Q that include vertical contour lines P, based on the ray-direction difference magnitude summation value, for each ray Q, makes it possible to identify the rays Q rapidly, and with high precision, when compared to a technique wherein a vertical contour line P is detected through performing image processing, such as a contour extracting process, or the like, on the difference image G.

FIG. 11 is diagrams for explaining the generation of an edge strength histogram Rb, wherein FIG. 11 (A) shows an example of an edge image E and FIG. 11 (B) shows an example of an edge strength histogram Rb that is obtained from the edge image E of FIG. 11 (A).

The edge strength histogram Rb is a graph that has, as its horizontal axis, the label numbers, as shown in FIG. 11 (B), and as it vertical axis has the value where whether or not there are pixel values is summed for each of the rays Q in the edge image E that is depicted in FIG. 11 (A) (where, in the below, this will be termed the "ray-direction edge strength summation value").

The edge image E is an image wherein contour components of an object (which may be a pattern, or the like, on an object) that appears in the overhead image are extracted in the overhead image that is the later among the first overhead image F1 and the second overhead image F2 (that is, the one that is the most recent, which, in the present embodiment, is the first overhead image F1). This edge image E is generated by the masked difference image generating portion 50 through converting, into values (strength values) that depend on brightness differences, the pixel values for each pixel, of the overhead image, wherein there is a large brightness difference (that is, of at least a prescribed value) from a nearby pixel. Consequently, the edge strength histogram Rb is a graph that shows, for each of the labels of the rays Q, the magnitude of the edge component of the three-dimensional object that is included in the ray Q.

The masked difference image generating portion 50, when generating the lookup table 92 in Step Sb1B of FIG. 6, identifies the rays Q wherein, in the difference histogram Ra, the ray-direction difference magnitude summation value exceeds the prescribed first threshold value Th1 and, in the edge strength histogram Rb, the ray-direction edge strength summation value exceeds the prescribed second threshold value Th2. Additionally, the masked difference image generating portion 50, in the lookup table 92, sets the pixel values to the "non-masked state" in these rays Q, and sets the pixel values to the "masked state" in the other rays Q.

Following this, the masked difference image generating portion 50 generates the mask image 90 by setting each of the pixel values for a label image 91 based on the lookup table 92 (Step Sb1C).

FIG. 12 is diagrams for explaining the generation of the mask image 90, wherein FIG. 12 (A) shows an example of a label image 91, and FIG. 12 (B) shows an example of a mask image 90.

A mask image 90, wherein regions corresponding to other-vehicle candidate regions 60 are non-masking regions 64 of a non-masked state and regions other than the non-masking regions 64 are masking regions 62, as depicted in FIG. 12 (B), is produced through applying the lookup table 92 to the label image 91 that is depicted in FIG. 12 (A).

Given this, the masked difference image generating portion 50 then, in Step Sb2, generates the masked difference image Gm, wherein regions other than the other-vehicle candidate regions 60 are masked, as depicted in FIG. 13, by superimposing the mask image 90 on the difference image G.

Additionally, when the masked difference image Gm is generated, the near ground contact line identifying portion 51 identifies a near ground contact line L1 based on the masked difference image Gm, as described above (FIG. 4: Step Sa1: near ground contact line identifying process).

FIG. 14 is a flowchart for the near ground contact line identifying process.

The near ground contact line identifying portion 51 first generates a masked difference histogram Rc for finding a near ground contact line L1 (Step Sc1).

FIG. 15 is diagrams for explaining the generation of a masked difference histogram Rc, wherein FIG. 15 (A) shows an example of a masked difference image Gm and FIG. 15 (B) shows an example of a masked difference histogram Rc that is obtained from the masked difference image Gm of FIG. 15 (A).

The masked difference histogram Rc is a graph that, as depicted in FIG. 15 (B), has as its horizontal axis the location in the crosswise direction Ch that is perpendicular to the travel direction B of the vehicle 2 (hereinafter termed the "crosswise-direction location"), and has, as it vertical axis, summation values of whether or not there are pixel values, along the travel direction B, for each region, where the crosswise direction of the masked difference image Gm, depicted in FIG. 15 (A) is partitioned into strip-shaped subregions at prescribed intervals (termed below the "travel-direction difference magnitude summation value"). Because in the masked difference image Gm, the parts other than the other-vehicle candidate regions 60 are masked, the near ground contact line L1 for the other vehicle A can be identified by the distribution of the travel-direction difference magnitude summation values in the crosswise direction Ch.

Specifically, as depicted in FIG. 14, described above, the near ground contact line identifying portion 51 sets a third threshold value Th3 for a travel-direction difference magnitude summation value that can be viewed as another vehicle A being present in that crosswise-direction location (Step Sc2). An intermediate value between the average Ave of the travel-direction difference magnitude summation value and the minimum value Min for the travel-direction difference magnitude summation value (=(Ave+Min)/2) is set for this third threshold value Th3.

The near ground contact line identifying portion 51 next identifies the near ground contact line L1 based on the range Uc of crosswise-direction locations over which the travel-direction difference magnitude summation value exceeds the third threshold value Th3 continuously over at least a prescribed number of locations in the masked difference histogram Rc.

Specifically, the near ground contact line identifying portion 51 sets, with equal spacing, evaluation points X at i locations (where i is an integer no less than 1) on the horizontal axis of the masked difference histogram Rc, as depicted in FIG. 16. Each evaluation point X may correspond to an interval in the horizontal axis of the masked difference histogram Rc (a column of the graph).

Given this, the near ground contact line identifying portion 51 evaluates sequentially, for each evaluation point X starting with that which is nearest to the location O, whether or not a prescribed near ground contact line evaluating requirement is satisfied, as depicted in FIG. 14, described above (Step Sc3), and if the requirement is not satisfied (Step Sc3: NO), the next evaluation point X is evaluated (Step Sc4). Moreover, if the near ground contact line evaluating requirement is satisfied (Step Sc3: YES), the near ground contact line identifying portion 51 identifies that the evaluation point X is the location of the near ground contact line L1 (Step Sc5).

The near ground contact line evaluating requirement, described above, is a requirement that the travel-direction difference magnitude summation value for the evaluation point X is no less than the third threshold value Th3 and that the travel-direction difference magnitude summation values at all of a prescribed number of evaluation points X, starting with the next evaluation point X, are no less than the third threshold value Th3.

Through evaluating the near ground contact line evaluating requirement sequentially, starting with the evaluation point X that is nearest to the imaging location O, the evaluation point X that, when viewed from the imaging location O, immediately precedes the range Uc wherein the travel-direction difference magnitude summation values for all of a prescribed number of evaluation points X exceed the third threshold value Th3 is found, so that evaluation point X is identified as the near ground contact line L1, as depicted in FIG. 16. Through this, the near ground contact line L1 is set to a more accurate location, without setting a near ground contact line L1 to a location that is within the other vehicle A (a range that exceeds the third threshold value Th3).

In this way, the identified location will be extremely accurate because the location of the near ground contact line L1 in the difference image G is identified based on the masked difference image Gm, wherein noise of shadows 76, and the like, is masked, rather than on the difference image G.

When the near ground contact line L1 is identified, the vehicle width identifying portion 52 executes a vehicle width identifying process as illustrated in FIG. 4, above (Step Sa8). In the vehicle width identifying process, the vehicle width identifying portion 52 identifies the vehicle width Vw of the other vehicle A based on the mask image 90, described above.

FIG. 17 is a flowchart for the vehicle width identifying process, and FIG. 18 is an explanatory diagram for various types of parameters set for the mask image 90 in the vehicle width identifying process.

In the vehicle width identifying process, the vehicle width identifying portion 52 first evaluates whether or not the location of the other vehicle A is within a vehicle width identifying requirement range (Step Se1). The vehicle width identifying requirement is a requirement that indicates whether or not the vehicle width Vw of another vehicle A that appears in the difference image G can be identified from the mask image 90. Note that the vehicle width identifying requirements will be described below.

If the location of the other vehicle A is not within the vehicle width identifying requirement range (Step Se1: NO), the vehicle width identifying portion 52 stops processing at that point, and if the location of the other vehicle A is within the vehicle width identifying requirement range (Step Se1: YES), the vehicle width identifying portion 52 executes the following processes to identify the vehicle width Vw of the other vehicle A.

That is, the vehicle width identifying portion 52 identifies the location of an end point V of the other vehicle A in the mask image 90 (Step Se2). The end point V of the other vehicle A is the front end VF or the back end VB of the other vehicle A that appears in the camera video 5. In an example of this operation, the other vehicle A appears in the camera video 5 of the rear camera, so the front end VF of the other vehicle A appears in the camera video 5 and in the difference image G obtained from the camera video 5. Consequently, in Step Se2, the location of the front end VF is identified as the end point V of the other vehicle A, as depicted in FIG. 18.

In the present embodiment, the vehicle width identifying portion 52 identifies the location of the end point V of the other vehicle A in the mask image 90 based on the masked difference image Gm.

Specifically, the vehicle width identifying portion 52 superimposes the near ground contact line L1 on the masked difference image Gm, and generates a masked difference image Gmt for identifying the end point, depicted in FIG. 19 (B) by further masking the region on the side of the vehicle 2 that is nearer to the imaging location O than on the near ground contact line L1 in the masked difference image Gm, as depicted in FIG. 19 (A).

Following this, the vehicle width identifying portion 52 generates a difference histogram Rgmt for end point identification from the masked difference image Gmt for end point identification, as depicted in FIG. 19 (C). The difference histogram Rgmt for end point identification is a graph wherein the lengthwise direction of the masked difference image Gmt for end point identification (which, in the present embodiment, is the rearward direction DB of the vehicle 2) is partitioned into strip-shaped subregions, at prescribed intervals, and for each of these regions whether or not there are pixel values is summed in the crosswise direction Ch of the masked difference image Gmt for end point specification. In the below, the summation values for these pixel values will be termed the "crosswise-direction difference magnitude summation values."

In the masked difference image Gmt for end point identification, the region on the side of the vehicle 2 that is closer to the imaging location O than the near ground contact line L1 is masked, in addition to masking the regions other than the other-vehicle candidate regions 60, making it possible to identify, from the distribution of the crosswise-direction difference magnitude summation values, the end portion of the other vehicle A that is the end portion on the side of the vehicle 2 that is nearer to the imaging location O (which, in the present embodiment, is the front end VF of the other vehicle A).

Specifically, the vehicle width identifying portion 52 identifies the end portion of the near side of the other vehicle A based on the difference histogram Rgmt for end point identification, using a technique that is similar to that with which the near ground contact line identifying portion 51 identified the near ground contact line L1 based on the masked difference histogram Rc.

That is, the vehicle width identifying portion 52 scans each interval of the difference histogram Rgmt for end point identification sequentially from the evaluating point X that is nearest to the imaging location O. Given this, if the crosswise-direction difference magnitude summation values for each interval in the difference histogram Rgmt for end point identification exceed the threshold value Thgmt for end point evaluation a prescribed number in a row, as depicted in FIG. 19 (B), the vehicle width identifying portion 52 identifies the interval at the beginning of this continuous interval (that is, the interval that, of the continuous intervals, is nearest to the imaging location O) Kgmt, as depicted in FIG. 19 (C). The vehicle width identifying portion 52 superimposes, onto the masked difference image Gm, an end portion line Lgmt that extends in the crosswise direction Ch passing through the location corresponding to the interval Pgmt in the masked difference image Gm. The end portion line Lgmt indicates the location of the end portion (the front end VF) of the other vehicle A in the masked difference image Gm. Currently, the vehicle width identifying portion 52 identifies the end point V in the masked difference image Gm by finding the intersecting point between the end portion line Lgmt and the near ground contact line L1.

Following this, the vehicle width identifying portion 52 identifies, as the location of the end point V in the mask image 90, the location in the mask image 90 that corresponds to the location of the end point V of the other vehicle A in the masked difference image Gm.

Following this, the vehicle width identifying portion 52 sets a cross line Lc that extends in the crosswise direction Ch passing through the end point V in the mask image 90, as depicted in FIG. 18 (FIG. 17: Step Se3). The vehicle width identifying portion 52 then scans the mask image 90, starting at the end point V, along the cross line Lc toward the far direction Chf (FIG. 18) away from the vehicle 2, to identify the intersecting point Vm between the cross line Lc and a non-masking region boundary N (FIG. 17: Step Se4).

Here the non-masking region boundary N is the boundary between the non-masking region 64 and the masking region 62, corresponding to the edge of the non-masking region 64. The non-masking region 64 corresponds to a region other than the masking region 62 of the difference image G, that is, corresponds to an other-vehicle candidate region 60 that is a candidate for the appearance of another vehicle A.

Moreover, the cross line Lc indicates a line that extends in the direction of width of the other vehicle A that appears in the difference image G, and the intersecting point Vm between the cross line Lc and the non-masking region boundary N indicates the front end VF or back end VB of the other vehicle A.

Consequently, the end point V identified in Step Se2 and the intersecting point of Vm identified in Step Se4 correspond to both ends, in the vehicle width direction, of the front end of the other vehicle A. Given this, the vehicle width identifying portion 52 identifies the vehicle width Vw in real space by converting the distance between the end point V and the intersecting point Vm in the mask image 90 to a distance in real space (Step Se5).

FIG. 20 is a diagram depicting examples of camera videos 5, overhead images F, and mask images 90 regarding a plurality of other vehicles A with different vehicle widths Vw. Note that in this figure, an ordinary vehicle (an ordinary four-wheel vehicle), a large bus (a large passenger vehicle), and a motorcycle (a two-wheel vehicle) are presented as examples of "other vehicles A."

As depicted in this figure, an appropriate vehicle width Vw is identified for each other vehicle A through the vehicle width identifying process.

Note that because, in the vehicle width identifying process, the vehicle width Vw is identified based on the end point V on the front or back end side of the other vehicle A in the mask image 90, it is not possible to identify the vehicle width Vw when the front or back end side does not appear in the overhead image F and the camera video 5. In this case, it would be unnecessary to execute the vehicle width identifying process.

Given this, in the present embodiment the requirement that the front or back end side of the other vehicle A appears in the camera video 5 is set in advance as the vehicle width identifying requirement discussed above, and whether or not the vehicle width identifying requirement is satisfied is evaluated in Step Sa1, at the beginning of the vehicle width identifying process, to avoid execution of unnecessary processing.

The requirement that the front or back end side of the other vehicle A appears in the camera video 5 can be stipulated through the range at which the other vehicle A is located among the full 360° surroundings centered on the vehicle 2. For example, as depicted in FIG. 21, a prescribed range β wherein the other vehicle A is substantially to the side of the vehicle 2 is set as a range wherein the front or back end side of the other vehicle A does not appear in the camera video 5 (the overhead image F in the example in FIG. 21), where the rest of the range, excluding this prescribed range β, is set as the vehicle width identifying requirement.

Given this, in Step Se1, the vehicle width identifying portion 52 evaluates whether or not the location of the other vehicle A is in a range other than the prescribed range β, and the processes of Step Se2 and beyond are executed only if the vehicle A is located within this range. Unnecessary execution of the vehicle width identifying process is prevented thereby. Note that the vehicle width identifying portion 52 may identify the location of the other vehicle A, in relation to the vehicle 2, based on, for example, the camera videos 5 of each of the cameras 4 or based on the overhead image F, or may perform the identification using a detection result by another object detecting sensor, such as a sonar, or the like.

When the vehicle width Vw is identified, the far ground contact line identifying portion 53 identifies the far ground contact line L2 in the difference image G, as illustrated in FIG. 4, above (Step Sa9). Specifically, the far ground contact line identifying portion 53 identifies, as the far ground contact line L2 in the difference image G, a line that is parallel to the near ground contact line L1 and that is separated, by the vehicle width Vw, from the near ground contact line L1.

The location of the far ground contact line L2 is found using the vehicle width Vw that is obtained from the mask image 90, so it is more accurate than when using a constant value wherein the vehicle width Vw has been established arbitrarily in advance.

Following this, the location identifying portion 54 identifies an other-vehicle region H in the difference image G (Step Sa10: three-dimensional object region identifying process).

The other-vehicle region H is identified by the near ground contact line L1 and the far ground contact line L2 that have been identified respectively by the near ground contact line identifying process (Step Sa1) and the far ground contact line identifying process (Step Sa9), and the front end VF and back end VB of the other vehicle A.

As described above, the front end VF and the back end VB of the other vehicle A can be found from the intersecting points of the vertical contour line P with the near ground contact line L1 and the far ground contact line L2.

That is, the back end near side location L1VB1 and the front end near side location L1VF in the near ground contact line L1 can be found through the respective intersecting points, with the near ground contact line L1, of the back end near side vertical contour line P1 and the front end near side vertical contour line P2 of the other vehicle A in the overhead image F, as depicted in FIG. 22. Moreover, similarly the back end far side location L2VB and the front end far side location L2VF in the far ground contact line L2 can be found through the respective intersecting points of the far ground contact line L2 with the back end near side vertical contour line P1 and the front end near side vertical contour line P2 of the other vehicle A.

Note that the back end near side location L1VB and the back end far side location L2VB indicate both ends, in the vehicle-width direction, at the back end side of the other vehicle A, and the front end near side location L1VF and the front end far side location L2VF indicate both ends, in the vehicle-width direction, of the front end of the other vehicle A.

However, in the overhead image F, the other vehicle A appears inclined in the direction of the rays Q, as described above, and thus the other-vehicle region H will be detected extending further in the travel direction B than it actually does, due to the effect of the roof part Ar, and the like, of the other vehicle A, producing error in the location of the other vehicle A.

With the three-dimensional object region identifying process according to the present embodiment, the location identifying portion 54 identifies the other-vehicle region H as described below in order to eliminate this error.

Specifically, as depicted in FIG. 23, the location identifying portion 54 finds the intersecting points LV with the rays Q that include the vertical contour lines P of the other vehicle A with the near ground contact line L1 and the far ground contact line L2. Following this, the location identifying portion 54 identifies a provisional first other-vehicle region H1 from an intersecting point LV in the near ground contact line L1, and identifies a provisional second other-vehicle region H2 from an intersecting point LV in the far ground contact line L2. The location identifying portion 54 identifies the front end VF and back end VB of the other vehicle A based on the area wherein the provisional first other-vehicle region H1 and the provisional second other-vehicle region H2 overlap. Given this, an accurate other-vehicle region H is identified by the near ground contact line L1, the far ground contact line L2, the front end VF, and the back end VB.

If here the accuracy of the far ground contact line L2 were poor, the provisional first other-vehicle region H1 and the provisional second other-vehicle region H2 would not overlap, so no other-vehicle region H would be identified. In contrast, in the present embodiment the far ground contact line L2 is identified accurately using the near ground contact line L1 that is identified based on the masked difference image Gm, and the vehicle width Vw that is identified based on the mask image 90, enabling the other-vehicle region H to be identified reliably.

The three-dimensional object region identifying process will be explained in greater detail below.

FIG. 24 is a flowchart of the three-dimensional object region identifying process.

The location identifying portion 54 first generates a near difference histogram Ran and a near edge strength histogram Rbn, and a far difference histogram Raf and a far edge strength histogram Rbf, in order to identify the provisional first other-vehicle region H1 and provisional second other-vehicle region H2 (Step Sd1).

FIG. 25 is diagrams for explaining the generation of the near difference histogram Ran, wherein FIG. 25 (A) shows an example of the difference image G and FIG. 25 (B) shows an example of the near difference histogram Ran that is obtained from the difference image G of FIG. 25 (A). Additionally, FIG. 26 is diagrams for explaining the generation of the near edge strength histogram Rbn, where FIG. 26 (A) shows an example of an edge image E and FIG. 26 (B) shows an example of a near edge strength histogram Rbn that is obtained from the edge image E of FIG. 26 (A).

As depicted in FIG. 25 (B), for the near difference histogram Ran, the difference histogram Ra, described above, is found for a near region Jn in the difference image G that is depicted in FIG. 25 (A). Moreover, as depicted in FIG. 26 (B), for the near edge strength histogram Rbn, the edge strength histogram Rb, described above, is found for the near region Jn of the edge image E, depicted in FIG. 26 (A).

The near region Jn is a region that is between the near ground contact line L1 and the far ground contact line L2 in the difference image G.

FIG. 27 is diagrams for explaining the generation of the far difference histogram Raf, wherein FIG. 27 (A) shows an example of the difference image G and FIG. 27 (B) shows an example of the far difference histogram Raf that is obtained from the difference image G of FIG. 27 (A). Additionally, FIG. 28 is diagrams for explaining the generation of the far edge strength histogram Rbf, wherein FIG. 28 (A) shows an example of the edge image E and FIG. 28 (B) shows an example of the far edge strength histogram Rbf that is obtained from the edge image E of FIG. 28 (A).

As depicted in FIG. 27 (B), for the far difference histogram Raf, the difference histogram Ra, described above, is found for a far region Jf of the difference image G, depicted in FIG. 27 (A). Additionally, as depicted in FIG. 28 (B), for the far edge strength histogram Rbf, the edge strength histogram Rb, described above, is found for the far region Jf in the edge image E, depicted in FIG. 28 (A).

The far region Jf is a region, in the difference image G, that is further than the near ground contact line L1 when viewed from the imaging location O.

A near mask label image 91n is used in generating the near difference histogram Ran and the near edge strength histogram Rbn, and a far mask label image 91f is used in generating the far difference histogram Raf and far edge strength histogram Rbf.

FIG. 29 is an explanatory diagram for the near mask label image 91n and the far mask label image 91f.

The near mask label image 91n is an image that disables the pixel values outside of the near region Jn in the difference image G, so as to exclude them from counting for the summation value. This near mask label image 91n can be produced through superimposing, on the label image 91, the near mask image 90n for masking all but the near region Jn in the difference image G, as depicted in FIG. 29.

Using the near mask label image 91n to produce the difference histogram Ra and the edge strength histogram Rb enables the location identifying portion 54 to find the near difference histogram Ran and the near edge strength histogram Rbn through having only the pixel values in the near region Jn be subject to adding to the summation value.

The far mask label image 91f is an image that disables the pixel values outside of the far region Jf in the difference image G, so as to exclude them from counting for the summation value, and is produced through superimposing, on the label image 91, the far mask image 90f for masking all but the far region Jf in the difference image G.

Using the far mask label image 91f to produce the difference histogram Ra and the edge strength histogram Rb enables the location identifying portion 54 to find the far difference histogram Raf and the far edge strength histogram Rbf through having only the pixel values in the far region Jf be subject to adding to the summation value.

Returning to FIG. 24, described above, the location identifying portion 54 next carries out a three-dimensional object evaluation in the near region Jn based on the near difference histogram Ran and the near edge strength histogram Rbn (Step Sd2).

Specifically, the location identifying portion 54 identifies the rays Q of the label numbers wherein the ray-direction difference magnitude summation value in the near difference histogram Ran is no less than a fourth threshold value Th4 (FIG. 25) and the ray-direction edge strength summation value in the near edge strength histogram Rbn is no less than a fifth threshold value Th5 (FIG. 26).

Given this, as depicted in FIG. 30, the location identifying portion 54 identifies the intersecting points LV of each of the identified rays Q with the near ground contact line L1 in the difference image G. The identification of these intersecting points LV is carried out for only a prescribed detection region that is set in the difference image G. The detection region is, for example, the detection region 72 (FIG. 3, FIG. 5), described above, or the like.

The provisional first other-vehicle region H1 is identified for the case of carrying out three-dimensional object detection that is limited to the near region Jn by these intersecting points LV. Note that the vehicle width Vw, identified in the vehicle width identifying process (FIG. 4: Step Sa9) is used for the width, in the crosswise direction Ch, of the provisional first other-vehicle region H1.

Returning to FIG. 24, described above, the location identifying portion 54 carries out three-dimensional object evaluation in the far region Jf based on the far difference histogram Raf and the far edge strength histogram Rbf (Step Sd3). Through this, the provisional second other-vehicle region H2 is identified for the case wherein three-dimensional object detection is carried out limited to the far region Jf.

If here, as described above, a plurality of other vehicles A are traveling in parallel, there is a possibility that more than one other vehicle A will be included in the provisional first other-vehicle region H1 and provisional second other-vehicle region H2. Given this, as described below, the location identifying portion 54 carries out grouping, for each individual other vehicle A respectively, for the various intersecting points LV in the near ground contact line L1 and the various intersecting points LV in the far ground contact line L2 (Step Sd4 and Sd5).

Using the intersecting points LV of the near ground contact line L1 as an example, as depicted in FIG. 31, the location identifying portion 54 sequentially searches each of the intersecting points LV in the near ground contact line L1, starting with that which is nearest to the imaging location O, where if the distance W between two adjacent intersecting points LV is no greater than a prescribed sixth threshold value Th6, these two intersecting points LV are classified as belonging to the same group 97, but if the distance W exceeds the prescribed sixth threshold value Th6, the intersecting point LV that is further from the imaging location O is classified as belonging to a new group 97.

Through this, the groups 97 are divided by locations wherein the spacing between intersecting points LV is greater than the sixth threshold value Th6, that is, by two different other vehicles A, to group intersecting points LV for each individual vehicle A. Given this, for each group 97 the location identifying portion 54 divides the provisional first other-vehicle region H1 for individual vehicles A by identifying single other-vehicle regions K1 through the intersecting points LV that belong to each individual group 97.

Returning to FIG. 24, above, the location identifying portion 54 determines the final single other-vehicle region K based on the single other-vehicle region K1 identified for the near ground contact line L1 and the single other-vehicle region K2 identified for the far ground contact line L2 (Step Sd6).

That is, as depicted in FIG. 32, of the front end VF and back end VB of the individual vehicles A of the single other-vehicle region K1 and single other-vehicle region K2, those in a range wherein the single other-vehicle region K1 and single other-vehicle region K2 overlap are identified as the front end VF and back end VB of the final single other-vehicle region K.

Given this, an accurate location of a rectangular single other-vehicle region K is identified through removing the error caused by the inclination that is the result of the projection conversion, doing so through the use of the front end VF and back end VB, and near ground contact line L1 and far ground contact line L2.

The first embodiment has effects such as the following.

The camera ECU 6 (three-dimensional object detecting device) according to the present embodiment generates a masked difference image Gm wherein, in a difference image G of a first overhead image F1 and a second overhead image F2 wherein the imaging locations O are aligned, all but an other-vehicle candidate region 60 that is a candidate for another vehicle A appearing therein is masked, and, identifies the location of the other vehicle A in the difference image G based on the masked difference image Gm.

Through this, the location of the other vehicle A can be identified with better accuracy than when identifying the location of the other vehicle A based on the difference image G, even when there is a shadow 76 between a vehicle 2 that is traveling and another vehicle A that is in the vicinity thereof.

Consequently, this enables more accurate automatic driving control in a vehicle control unit 8 in a scenario wherein there is proximity with another vehicle, such as when changing lanes, merging, branching, or the like, based on the accurate location of the other vehicle A.

In addition, the camera ECU 6 is provided with a vehicle width identifying portion 52 for finding the end point V of another vehicle A based on the masked difference image Gm, to identify the vehicle width Vw of the other vehicle A based on the distance between the end point V of the other vehicle A and a non-masking region boundary N, in a mask image 90. This enables the location of the other vehicle A to be identified more accurately than if the camera ECU 6 were to identify the location of the other vehicle A using a constant value, established arbitrarily in advance, for the vehicle width Vw.

Additionally, because the vehicle width identifying portion 52 identifies the vehicle width Vw based on the mask image 90 that is provided in generating the masked difference image Gm, the vehicle width Vw can be identified efficiently through the use of the mask image 90 that already exists.

The vehicle width identifying portion 52 according to the present embodiment identifies an intersecting point Vm between a non-masking region boundary N and a cross line Lc that extends from the end point V of the other vehicle A in the vehicle-width direction of the other vehicle A, to identify the vehicle width Vw based on the distance between the intersecting point Vm and the end point V of the other vehicle A. This allows the vehicle width Vw of the other vehicle A to be found accurately from the mask image 90.

The vehicle width identifying portion 52 according to the present invention scans the mask image 90 along a cross line Lc that extends from the end point V of the other vehicle A in the vehicle-width direction of the other vehicle A, to thereby identify the intersecting point Vm, described above.

This enables the intersecting point Vm to be identified relatively easily.

The location identifying portion 54 according to the present embodiment identifies a provisional first other-vehicle region H1 wherein the other vehicle A is located at a near ground contact line L1, and a provisional second other-vehicle region H2 wherein the other vehicle A is located in a far ground contact line L2, based on the respective intersecting points LV, of the near ground contact line L1 and the far ground contact line L2, with rays Q that include vertical contour lines P of the other vehicle A, to identify an other-vehicle region H in the difference image G based on the range wherein these provisional first other-vehicle region H1 and provisional second other-vehicle region H2 overlap.

This removes the effect of inclination through projection conversion, enabling the other-vehicle region H to be identified accurately.

Moreover, if the accuracy of the far ground contact line L2 were poor, the provisional first other-vehicle region H1 and the provisional second other-vehicle region H2 would not overlap, so no other-vehicle region H would be identified. In contrast, in the present embodiment the far ground contact line L2 is identified accurately using the near ground contact line L1 that is identified based on the masked difference image Gm, and the vehicle width Vw that is identified based on the mask image 90, enabling the other-vehicle region H to be identified reliably.

The near ground contact line identifying portion 51 according to the present embodiment identifies the near ground contact line L1 of the other vehicle A in the difference image G based on the location, in the horizontal axis, where the travel-direction difference magnitude summation value exceeds a third threshold value Th3 in a masked difference histogram Rc generated based on the masked difference image Gm. Through this, the near ground contact line L1 is identified accurately using the masked difference image Gm.

The embodiment set forth above is no more than an illustration of one form of the present invention, and the present invention may be modified and applied appropriately in a range that does not deviate from the spirit and intent thereof.

Modified Example of the First Embodiment

The vehicle width identifying process described above (FIG. 17) can be modified as follows.

Specifically, the vehicle width identifying portion 52 scans along the cross line Lc toward the far direction Chf, starting at the end point V, in the mask image 90 to identify an intersecting point Vm of the cross line Lc and a non-masking region boundary N (FIG.

However, when there are contour lines of parts or patterns on the vehicle body side surface, or shadows of the vehicle 2, or the like, that appear in the camera video 5, one or more masking regions 62A (being a single region in the example that is illustrated), for masking the part that appears, are produced in the mask image 90, as depicted in FIG. 33, for example. The masking region 62A is produced within a non-masking region 64 for a single vehicle (corresponding to the other-vehicle candidate region 60 of the difference image G), so the non-masking region 64 is divided into a plurality of regions (which, in the illustrated example, is two regions). Consequently, in this case there will be a number of intersecting points Vm1, Vm2, . . . , equal to the number of non-masking regions 64 that are cut by the cross line Lc in the far direction Chf, starting at the end point V. In such a case, if the vehicle width identifying portion 52 were to find the vehicle width Vw1 based on the intersecting point Vm1 detected first when scanning along the cross line Lc, a vehicle width Vw1 that is shorter than the actual vehicle width Vw would be found.

Given this, in the vehicle width identifying process, when the vehicle width identifying portion 52 starts at the end point V and scans along the cross line Lc, in the far direction Chf (Step Se4), the vehicle width identifying portion 52 may scan to the edge 90F of the mask image 90, to thereby identify all intersecting points Vm1, Vm2, . . . , that exist between the end point V and the edge 90F. In this case, the vehicle width identifying portion 52 identifies, from among the vehicle widths Vw1 and Vw2, calculated from the intersecting points of Vm1 and Vm2, that which has a reasonable value for the vehicle width Vw of the other vehicle A.

Note that instead of a structure for identifying all of the intersecting points Vm1, Vm2, . . . , that exist between the end point V and the edge 90F, the vehicle width identifying portion 52 may be structured as follows.

Specifically, there is a tendency for the masking region 62A that is produced due to contour lines included in the vehicle 2 or shadows of the vehicle 2 to be relatively narrow. Given this, a structure is used wherein a prescribed width for distinguishing the masking region 62A from another masking region 62 is set in advance in the vehicle width identifying portion 52.

Given this, when scanning along the cross line Lc, the vehicle width identifying portion 52, each time an intersecting point Vm is detected, detects the width 62Aw (FIG. 33) along the cross line Lc of the masking region 62A that includes the intersecting point Vm, and compares the width 62Aw to the prescribed width. Based on the comparison result, the vehicle width identifying portion 52 evaluates whether or not the intersecting point Vm belongs to a masking region 62A that is caused by a shadow, or the like, of the vehicle 2, and if the intersecting point Vm does not belong to the masking region 62A, identifies the vehicle width Vw based on the intersecting point Vm.

Second Embodiment

In the first embodiment, the vehicle width identifying portion 52 scans the mask image 90, starting at the end point V, along the cross line Lc toward the far direction Chf away from the vehicle 2, to identify the intersecting point Vm between the cross line Lc and a non-masking region boundary N. Given this, the vehicle width identifying portion 52 identifies the vehicle width Vw of the other vehicle A based on the end point V and the intersecting point Vm.

In the present embodiment, the vehicle width identifying portion 52 identifies the vehicle width Vw of another vehicle A using the most distant non-masking region boundary Nf that is located furthest from the imaging location O, from among the non-masking region boundaries N that are boundaries between non-masking regions 64 and masking regions 62 in the mask image 90.

FIG. 34 is a flowchart for the vehicle width identifying process relating to the present embodiment, and FIG. 35 is an explanatory diagram for various types of parameters set for the mask image 90 in the vehicle width identifying process.

In the vehicle width identifying process, the vehicle width identifying portion 52 first evaluates whether or not the location of the other vehicle A is within a vehicle width identifying requirement range (Step Sg1), in the same manner as with the vehicle width identifying process of the first embodiment (FIG. 17). If the location of the other vehicle A is not within the vehicle width identifying requirement range (Step Sg1: NO), the vehicle width identifying portion 52 stops processing at that point, and if the location of the other vehicle A is within the vehicle width identifying requirement range (Step Sg1: YES), the vehicle width identifying portion 52 executes the following processes to identify the vehicle width Vw of the other vehicle A.

That is, the vehicle width identifying portion 52 identifies the most distant non-masking region boundary Nf from among the non-masking region boundaries N in the mask image 90 (Step Sg2).

The non-masking region boundary N is the boundary between the non-masking region 64 and the masking region 62, corresponding to the edge of the non-masking region 64. The non-masking region 64 corresponds to a region other than the masking region 62 of the difference image G, that is, corresponds to an other-vehicle candidate region 60 that is a candidate for the appearance of another vehicle A. The most distant non-masking region boundary Nf is the non-masking region boundary N that is located furthest, in the crosswise direction Ch, from the imaging location O in the mask image 90.

When there are contour lines of parts or patterns on the vehicle body side surface, or shadows of the vehicle 2, or the like, that appear in the camera video 5, one or more masking regions 62A (being a single region in the example that is illustrated), for masking the part that appears, are produced in the mask image 90, as depicted in FIG. 35, for example. The masking region 62A is produced within a non-masking region 64 for a single vehicle (corresponding to the other-vehicle candidate region 60 of the difference image G), so what is actually a single non-masking region 64 is divided into a plurality of regions (which, in the illustrated example, is two regions). Consequently, identifying the most distant non-masking region boundary Nf means that the non-masking region boundary N of the non-masking region 64 that is split by the masking region 62A will be identified.

In Step Sg2, the vehicle width identifying portion 52 identifies the most distant non-masking region boundary Nf as follows.

Specifically, the vehicle width identifying portion 52 sets a plurality of detection points Dt on a first cross line Lc1 that extends straight in the crosswise direction Ch from the imaging location O, depicted in FIG. 35. Next the vehicle width identifying portion 52 scans in the lengthwise direction from each detection point Dt in the far direction Cvf, away from the imaging location O (which, in the present embodiment, matches the rearward direction DB of the vehicle 2), to identify the most distant non-masking region boundary point Nfd. The most distant non-masking region boundary point Nfd is a point that structures the most distant non-masking region boundary Nf, and in the process of scanning by the vehicle width identifying portion 52, is identified by the point wherein there is a change from a masking region 62 to a non-masking region 64.

Following this, the vehicle width identifying portion 52 finds an approximation line Lapp using an arbitrary linear approximation technique from the most distant non-masking region boundary points Nfd of each of the detection points Dt. This approximation line Lapp serves as the most distant non-masking region boundary Nf.

After identifying the non-masking region boundary Nf through the approximation line Lapp, the vehicle width identifying portion 52 identifies the location of the end point V of the other vehicle A in the mask image 90, as depicted in FIG. 34 (Step Sg3). In the present embodiment as well, the vehicle width identifying portion 52 carries out the same process as in Step Se2 of FIG. 17, explained in the first embodiment, to identify the location of the end point V of the other vehicle A in the mask image 90 based on the masked difference image Gm.

Following this, the vehicle width identifying portion 52 sets a second cross line Lc2 that extends straight in the crosswise direction Ch through the end point V in the mask image 90 (FIG. 34: Step Sg4), as depicted in FIG. 35. Additionally, the vehicle width identifying portion 52 identifies the intersecting point Vm between the second cross line Lc2 and the approximation line Lapp (the most distant non-masking region boundary Nf) in the mask image 90 (FIG. 34: Step Sg5).

Here the second cross line Lc2 indicates a line that extends in the vehicle-width direction of the other vehicle A that appears in the difference image G, and the intersecting point Vm between the second cross line Lc2 and the approximation line Lapp indicates the front end VF or back end VB of the other vehicle A.

Consequently, the end point V identified in Step Sg3 and the intersecting point of Vm identified in Step Sg5 correspond to both ends, in the vehicle width direction, of the front end of the other vehicle A. Given this, the vehicle width identifying portion 52 identifies the vehicle width Vw in real space by converting the distance between the end point V and the intersecting point Vm in the mask image 90 to a distance in real space (Step Sg6).

In this way, the vehicle width identifying portion 52 identifies the most distant non-masking region boundary Nf in the mask image 90, and uses the most distant non-masking region boundary Nf to identify the vehicle width Vw.

Through this, the non-masking region boundary N of the actual non-masking region 64 is identified through the most distant non-masking region boundary Nf, to find the vehicle width Vw accurately, even when what is actually a single non-masking region 64 is split into a plurality through the production of a masking region 62A caused by a contour line of a part or pattern of the vehicle body side face or by a shadow of the vehicle 2, or the like, in the mask image 90.

The present embodiment has effects such as the following.

The vehicle width identifying portion 52 of the present embodiment identifies, in the mask image 90, an intersecting point Vm between the most distant non-masking region boundary Nf and the second cross line Lc2 that passes through the end point V of the other vehicle A, to identify the vehicle width Vw of the other vehicle A based on the distance between the end point V and the intersecting point Vm. Through this, the non-masking region boundary N of the actual non-masking region 64 is identified through the most distant non-masking region boundary Nf, to find the vehicle width Vw accurately, even when what is actually a single non-masking region 64 is split into a plurality through the production of a masking region 62A (FIG. 18) caused by a contour line of a part or pattern of the vehicle body side face or by a shadow of the vehicle 2, or the like, in the mask image 90.

The vehicle width identifying portion 52 according to the present embodiment scans, in the far direction Cvf, along the lengthwise direction of the mask image 90, from each of a plurality of detection points Dt that are set on a first cross line Lc1 that extends straight in the vehicle-width direction of the other vehicle A from the imaging location O in the mask image 90, to identify most distant non-masking region boundary points Nfd wherein there are changes from the masking region 62 to the non-masking region 64. Given this, the vehicle width identifying portion 52 uses a linear approximation technique to find an approximation line from each of the most distant non-masking region boundary points Nfd for each of the detection points Dt, to identify the most distant non-masking region boundary Nf.

This enables the most distant non-masking region boundary Nf to be identified reliably.

Modified Examples of the First Embodiment and Second Embodiment

While, in the first embodiment and the second embodiment, the camera ECU 6 functioned as the three-dimensional object detecting device, there is no limitation thereto, but rather an arbitrary device equipped in the on-vehicle system 1 may function as the three-dimensional object detecting device.

In the embodiments set forth above, the functional blocks depicted in FIG. 2 are a schematic diagram for partitioning the structural elements of the camera ECU 6 depending on the main processing content, for ease in understanding the invention of the present application, but the structural elements of the camera ECU 6 may be partitioned into a larger number of structural elements depending on the processing detail. Moreover, the partitioning may be such that more processes are carried out by a single structural element.

In the first and second embodiment, directions, such as horizontal and vertical, and also various shapes, include directions that are similar thereto and approximations of said shapes, unless specifically stated otherwise, and insofar as there are identical effects in operation (termed the "range of equivalency").

EXPLANATIONS OF REFERENCE SYMBOLS

1: On-Vehicle System
2: Vehicle

4: Imaging Portion
6: Camera ECU (Three-Dimensional Object Detecting Device, Computer)
9A: Display Device
24: Three-Dimensional Object Location Identifying Portion
30: Camera Video Acquiring Portion
34: Overhead View Converting Processing Portion
36: Difference Image Generating Portion
50: Masked Difference Image Generating Portion
51: Near Ground Contact Line Identifying Portion
52: Vehicle Width Identifying Portion (Width Identifying Portion)
53: Far Ground Contact Line Identifying Portion
54: Location Identifying Portion
60: Other-vehicle Candidate Region
62, 62A: Masking Regions
64: Non-Masking Region
90: Mask Image
A: Other Vehicle (Three-Dimensional Object)
B: Travel Direction
Ch: Crosswise Direction
Chf: Far Direction
Dt: Detection Point
E: Edge Image
F: Overhead Image
G: Difference Image
Gm: Masked Difference Image
H: Other-Vehicle Region
H1: Provisional First Other-Vehicle Region (First Region)
H2: Provisional Second Other-Vehicle Region (Second Region)
L1: Near Ground Contact Line
L2: Far Ground Contact Line
Lapp: Approximation Line
Lc: Cross Line
M: Captured Image
N: Masking Region Boundary
Nf: Most Distant Non-Masking Region Boundary
Nfd: Most Distant Non-Masking Region Boundary Point
O: Imaging Location
P: Vertical Contour Line
Q: Ray
Rc: Masked Difference Histogram
Th3: Third Threshold Value
V: End Point
Vm, Vm1, Vm2: Intersecting Points
Vw, Vw1, Vw2: Vehicle Widths

The invention claimed is:

1. A three-dimensional object detecting device comprising:
    an overhead view converting processing portion for converting, into a respective first overhead image and second overhead image, a first captured image and a second captured image captured by a camera at different times in a vehicle that is traveling;
    a difference image generating portion for generating a difference image between the first overhead image and the second overhead image, with the imaging locations thereof aligned to each other;
    a masked difference image generating portion for generating a mask image for masking all but a three-dimensional object candidate region that is a candidate for the appearance of a three-dimensional object in the difference image, and masking the difference image with the mask image to generate a masked difference image;
    a near ground contact line identifying portion for identifying a near ground contact line of a three-dimensional object in the difference image based on the masked difference image;
    a width identifying portion for finding an end point of the three-dimensional object based on the masked difference image, and for identifying the width of the three-dimensional object based on the distance between the end point of the three-dimensional object and a non-masking region boundary that is a boundary of a non-masking region in the mask image;
    a far ground contact line identifying portion for identifying a far ground contact line of the three-dimensional object in the difference image based on the width of the three-dimensional object and the near ground contact line; and
    a location identifying portion for identifying the location of the three-dimensional object in the difference image based on the near ground contact line and to the far ground contact line.

2. A three-dimensional object detecting device set forth in claim 1, wherein:
    the width identifying portion identifies an intersecting point of the non-masking region boundary and a line that extends in the width direction of the three-dimensional object from an end point of the three-dimensional object, identifies the width of the three-dimensional object based on the distance between the intersecting point and the end point of the three-dimensional object.

3. A three-dimensional object detecting device set forth in claim 2, wherein:
    the width identifying portion identifies the intersecting point by scanning the mask image from an end point of the three-dimensional object along a line that extends in the width direction of the three-dimensional object.

4. A three-dimensional object detecting device comprising:
    an overhead view converting processing portion for converting, into a respective first overhead image and second overhead image, a first captured image and a second captured image captured by a camera at different times in a vehicle that is traveling;
    a difference image generating portion for generating a difference image between the first overhead image and the second overhead image, with the imaging locations thereof aligned to each other;
    a masked difference image generating portion for generating a mask image for masking all but a three-dimensional object candidate region that is a candidate for the appearance of a three-dimensional object in the difference image, and masking the difference image with the mask image to generate a masked difference image;
    a near ground contact line identifying portion for identifying a near ground contact line of a three-dimensional object in the difference image based on the masked difference image;
    a width identifying portion for identifying the width of the three-dimensional object;
    a far ground contact line identifying portion for identifying a far ground contact line of the three-dimensional object in the difference image based on the width of the three-dimensional object and the near ground contact line; and
    a location identifying portion for identifying the location of the three-dimensional object in the difference image based on the near ground contact line and to the far ground contact line, wherein:

the width identifying portion:
finds an end point of the three-dimensional object based on the masked difference image; and
identifies an intersecting point between a most distant non-masking region boundary that is a boundary of a non-masking region that is located most distant from the imaging location in the mask image, and a straight line that extends in the width direction of the three-dimensional object through an end point of the three-dimensional object that has been found based on the masked difference image, to identify the width of the three-dimensional object based on the distance between the end point and the intersecting point.

5. A three-dimensional object detecting device set forth in claim 4, wherein:

the width identifying portion:
in the mask image, scans in the far direction, away from the imaging location, along the lengthwise direction of the mask image from each of a plurality of detection points set on a straight line that extends in the crosswise direction of the three-dimensional object from the imaging location, to identify a most distant non-masking region boundary point wherein there is a change from a masking region to a non-masking region; and
identifies the most distant non-masking region boundary by finding an approximation line, using a linear approximation technique, from each of the most distant non-masking region boundary points of the detection points.

6. A three-dimensional object detecting device set forth in claim 1, wherein:

the location identifying portion identifies a three-dimensional object region wherein the three-dimensional object appears in the difference image based on the range of overlap between a first region wherein the three-dimensional object is located on the near ground contact line and a second region wherein the three-dimensional object is located in the far ground contact line, based on respective intersecting points of the near ground contact line and the far ground contact line and rays that extend from the imaging location and that include vertical contour lines of the three-dimensional object in the difference image.

7. A three-dimensional object detecting device set forth in claim 1, wherein:

the near ground contact line identifying portion identifies the near ground contact line based on the location in the horizontal axis in a masked difference histogram that has, as the horizontal axis, the crosswise direction that is perpendicular to the direction of travel of the vehicle and, as the vertical axis, a travel-direction difference magnitude summation value wherein the pixel values of the individual pixels in the masked difference image are summed along the direction of travel, wherein the travel-direction difference magnitude summation value exceeds a third threshold value.

8. An on-vehicle system comprising:
a three-dimensional object detecting device set forth in claim 1; and
a display device for displaying the location of another vehicle, identified by the three-dimensional object detecting device.

9. A three-dimensional object detecting method wherein a computer is provided with:

a step for converting, into a respective first overhead image and second overhead image, a first captured image and a second captured image captured by a camera at different times in a vehicle that is traveling;
a step for generating a difference image between the first overhead image and the second overhead image, with the imaging locations thereof aligned to each other;
a step for generating a mask image for masking all but a three-dimensional object candidate region that is a candidate for the appearance of a three-dimensional object in the difference image, and masking the difference image with the mask image to generate a masked difference image;
a step for identifying a near ground contact line of a three-dimensional object in the difference image based on the masked difference image;
a step for finding an end point of the three-dimensional object based on the masked difference image, and for identifying the width of the three-dimensional object based on the distance between the end point of the three-dimensional object and a non-masking region boundary that is a boundary of a non-masking region in the mask image;
a step for identifying a far ground contact line of the three-dimensional object in the difference image based on the width of the three-dimensional object and the near ground contact line; and
a step for identifying the location of the three-dimensional object in the difference image based on the near ground contact line and to the far ground contact line.

10. A three-dimensional object detecting method wherein a computer is provided with:

a first step for converting, into a respective first overhead image and second overhead image, a first captured image and a second captured image captured by a camera at different times in a vehicle that is traveling;
a second step for generating a difference image between the first overhead image and the second overhead image, with the imaging locations thereof aligned to each other;
a third step for generating a mask image for masking all but a three-dimensional object candidate region that is a candidate for the appearance of a three-dimensional object in the difference image, and masking the difference image with the mask image to generate a masked difference image;
a fourth step for identifying a near ground contact line of a three-dimensional object in the difference image based on the masked difference image;
a fifth step for identifying the width of the three-dimensional object;
a sixth step for identifying a far ground contact line of the three-dimensional object in the difference image based on the width of the three-dimensional object and the near ground contact line; and
a seventh step for identifying the location of the three-dimensional object in the difference image based on the near ground contact line and to the far ground contact line, wherein:

the fifth step:
finds an end point of the three-dimensional object based on the masked difference image; and
identifies an intersecting point between a most distant non-masking region boundary that is a boundary of a non-masking region that is located most distant from the imaging location in the mask image, and a straight line that extends in the width direction of the three-dimensional object through an end point of the three-dimensional object that has been found based on the masked difference image, to identify the width of the three-dimensional object based on the distance between the end point and the intersecting point.

\* \* \* \* \*